(12) United States Patent
Miranda et al.

(10) Patent No.: US 10,685,044 B2
(45) Date of Patent: Jun. 16, 2020

(54) IDENTIFICATION AND MANAGEMENT SYSTEM FOR LOG ENTRIES

(71) Applicant: Accenture Global Solutions Limited, Dublin (IE)

(72) Inventors: Abhilash Alexander Miranda, Dublin (IE); Laura Alvarez, Dublin (IE); Edward Burgin, Nottingham (GB); Victor Oliveira Antonino, Dublin (IE); Yaxuan Yu, Dublin (IE); Gaurav Kaila, Dublin (IE); Medb Corcoran, Dublin (IE); Jessica Maria Kearney, Northern Ireland (GB); Konstantinos Mammas, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 225 days.

(21) Appl. No.: 15/804,815

(22) Filed: Nov. 6, 2017

(65) Prior Publication Data
US 2018/0357299 A1  Dec. 13, 2018

Related U.S. Application Data

(60) Provisional application No. 62/516,626, filed on Jun. 7, 2017.

(51) Int. Cl.
G06F 16/28    (2019.01)
G06N 5/04     (2006.01)
G06F 16/23    (2019.01)

(52) U.S. Cl.
CPC .......... *G06F 16/285* (2019.01); *G06F 16/235* (2019.01); *G06F 16/2358* (2019.01); *G06N 5/04* (2013.01)

(58) Field of Classification Search
CPC .... G06F 16/295; G06F 16/215; G06F 16/248; G06F 16/335
See application file for complete search history.

(56) References Cited

U.S. PATENT DOCUMENTS 7,076,508 B2    7/2006   Bourbonnais et al.
7,788,536 B1 *  8/2010   Qureshi ................ G06F 11/079
                                              714/38.14

(Continued)

OTHER PUBLICATIONS

Australian Patent Office, Examination Report No. 1 in Australian Application No. 2018202527 dated May 25, 2018, pp. 1-9.

(Continued)

*Primary Examiner* — Daniel A Kuddus
(74) *Attorney, Agent, or Firm* — Brinks Gilson & Lione

(57) ABSTRACT

An identification and management system for log entries may filter historical data and generate closed log entries as a reference dataset. A dynamic learning engine may perform statistical modelling using the reference dataset to assign predetermined categories to each of a number of open log entries. An automation index may be generated for each of the open log entries. The automation index is indicative of accuracy of the assigned categories. Some of the open log entries may be identified as priority log entries which are representative of a group of the open log entries. The assigned category of the priority log entries may be analyzed for accuracy and the results of the analysis may be used to train the statistical model so that the open log entries may be iteratively assigned and re-assigned a category until the category of each open log entry reaches a desired accuracy.

23 Claims, 8 Drawing Sheets

(56) References Cited

U.S. PATENT DOCUMENTS

| | | | | |
|---|---|---|---|---|
| 7,831,617 B2* | 11/2010 | Bruckner | G06F 16/244 | 707/783 |
| 8,239,335 B2* | 8/2012 | Schmidtler | G06N 20/00 | 706/20 |
| 8,386,401 B2* | 2/2013 | Virkar | G06N 20/00 | 706/12 |
| 8,805,759 B1* | 8/2014 | Cha | G06F 17/00 | 706/45 |
| 8,965,820 B2* | 2/2015 | Kapadia | G06N 5/025 | 706/20 |
| 2010/0063948 A1* | 3/2010 | Virkar | G06N 20/00 | 706/12 |
| 2011/0035347 A1* | 2/2011 | Shama | G06Q 30/02 | 706/21 |
| 2011/0145178 A1* | 6/2011 | Schmidtler | G06N 20/00 | 706/12 |
| 2013/0238533 A1* | 9/2013 | Virkar | G06N 20/00 | 706/12 |
| 2014/0067737 A1* | 3/2014 | Kapadia | G06N 5/025 | 706/20 |
| 2015/0213358 A1* | 7/2015 | Shelton | H04L 41/0604 | 706/47 |
| 2015/0286955 A1* | 10/2015 | Virkar | G06N 20/00 | 706/12 |
| 2016/0078367 A1* | 3/2016 | Adjaoute | G06N 5/04 | 706/12 |
| 2016/0299923 A1* | 10/2016 | Nefedov | G06F 21/552 | |
| 2016/0299934 A1* | 10/2016 | Karandikar | G06F 16/2358 | |
| 2017/0278015 A1* | 9/2017 | Miranda | G06N 20/00 | |

OTHER PUBLICATIONS

Examination Report No. 2 for Australia Application No. 2018202527, dated Dec. 10, 2018, pp. 1-6, issued in Australian Application No. 2018202527, Offices of IP Australia, Woden, ACT, Australia.

Examination Report No. 3 for Australia Application No. 2018202527, dated May 16, 2019, pp. 1-4, issued in Australian Application No. 2018202527, Offices of IP Australia, Woden, ACT, Australia.

* cited by examiner

IDENTIFICATION AND MANAGEMENT SYSTEM FOR LOG ENTRIES

CROSS REFERENCE TO RELATED APPLICATIONS

The present application is entitled to a right of priority pursuant to 35 U.S.C. § 119 from U.S. Provisional Patent Application No. 62/516,626 filed Jun. 7, 2017, which is herein entirely incorporated by reference.

TECHNICAL FIELD

This disclosure relates to log entries, and more particularly, to an identification and management system for log entries.

BACKGROUND

The volumes of digital information being created and stored by manual, semi-manual and/or automated computer processes and logic is ever increasing. Identification of transactions within such digital information can be quite challenging. Variations and variability in such digital information greatly increases the complexity of performance of any form of automated transaction processing. In addition, management of such digital information, such as by organizing or characterizing the digital information and/or transactions can be quite complex not only due to the sheer volume of the digital information, but also due to the variability and multifaceted characteristics of such information. Accordingly, systems and methods are needed to identify and manage such transactional activities contained with digital information.

SUMMARY

An identification and management system for transaction activities may automate the grouping of log entries. The system may minimize the computational complexity of any statistical learning related to management of log entries by reducing the volume of historical log entries in order to reduce computational complexity in determining groupings of the log entries. The system may also include statistical sampling and efficient vector-representation of log entries to increase accuracy. The statistical sampling may perform choice-based stratified sampling of log entries, which may be corrected for any selection bias towards dominant groups based on (a) the frequency of a target variable or target label classification in supervised learning (b) the density of the groups or clusters formed in unsupervised learning. The system may further perform updating of grouped log entries by performing updates of category identifiers of the groupings using supervised or unsupervised learning. The system may also maximize average grouping confidence of grouping provided by statistical modeling with a dynamic learning engine.

Other systems, methods, features and advantages will be, or will become, apparent to one with skill in the art upon examination of the following figures and detailed description. It is intended that all such additional systems, methods, features and advantages be included within this description, be within the scope of the invention.

BRIEF DESCRIPTION OF THE DRAWINGS

The embodiments may be better understood with reference to the following drawings and description.

DETAILED DESCRIPTION

An identification and management system for transactional activities may be used to process large volumes of transactional data in the form of log entries. The system may minimize the computational complexity of statistical learning by reduction in the volume of log entries. This reduction is performed by the system using a systematic and repeatable approach for filtering raw transaction historical data to generate closed log entries which are stored in a reference dataset in a modeling database. The filtering is performed in order to reduce computational complexity in determining, based on the reference dataset, groupings and categorization of open log entries received by the system. The system may also statistically sample and perform efficient vector-representation of the closed log entries generated from the historical data. Using these techniques, the system may automatically perform choice-based stratified sampling of the open log entries. The choice-based stratified sampling may be leveraged to correct for any bias towards selection of dominant categories within which the open log entries are grouped. Correction may be based on adjusting the groupings of the open log entries. For example, the categorization of open log entries may include supervised learning based on a frequency of occurrence of a predetermined target variable or label in the open log entries. Open log entries which are grouped and categorized by the system may be further refined using supervised learning. A confidence level for the categorization assigned to the respective open log entries may also be generated for each of the open log entries. The system may perform further operations to maximize average grouping confidence.

Figure 1:
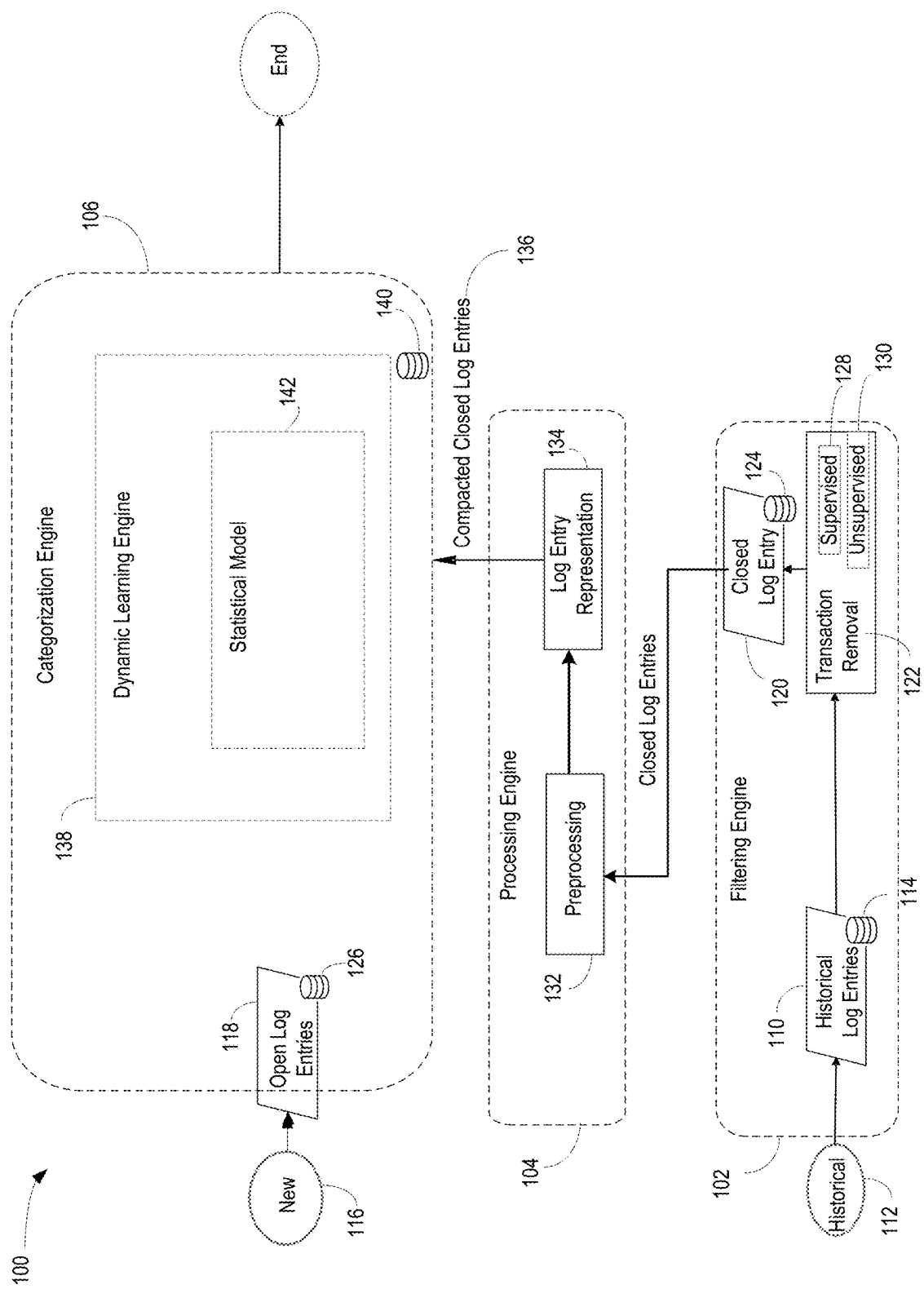
FIG. 1 is a block diagram of an example of an identification and management system for log entries.

Referring to FIG. 1, the identification and management system 100 may include a filtering engine 102, a processing engine 104, and a categorization engine 106. In other examples, fewer or greater numbers of engines may be included to represent the system 100. The following terms are used to describe various aspects of the system 100.

Historical Log Entries—Historical log entries 110 are historical data representing transactions. Historical log entries 110 may include a file or a portion of a file. For example, a historical log entry 110 may include a row, a column, and/or a cell on a spreadsheet or in a database. Alternatively or in addition, a historical log entry 110 may include text, bitmaps, post script, HTML and any other form of digital content. In some examples, a document image may be converted into a historical log entry 110 through, for example, optical character recognition (OCR). Historical transaction data 112 may be stored in a historical transactions database 114. The historical transactions database 114 may be any form of data storage device or system, and may be configured to store legacy historical log entries 110 and other information, such as raw data in the form of, for example, security access logs and/or ledger transactions of a company or business.

Log entries—Log entries may be transactions that include open log entries 118 and closed log entries 120. Open log entries 118 may be new log entries provided to the system for processing from new transaction data 116. Closed log entries 120 may be formerly open log entries 118 that have been categorized, and the categorization has been confirmed as accurate to a predetermined percentage of accuracy. Closed log entries 120 may also include log entries obtained from historical transaction data 112 that have been previously categorized in a predetermined category, and therefore include a category identifier. Historical transaction data 112 in the form of the historical log entries 110, which may be a log or record of an activity, event, or incident, with its relevant attributes are filtered with the filtering engine 102 to generate the closed log entries 120. Filtering may be performed with a transaction removal engine 122. Filtering may include removal of inconsistent historical log entries 110 or exception historical log entries 110 to generate closed log entries 120.

Attributes of a log entry (an open log entry 118 or a closed log entry 120) refer to, for example, characteristics, details, labels, and the like, that may include an identifier of the log entry, a sequence number, a time-stamp, an origin indication, a status, a recorder, a receiver, a description, log entry values, and the like. In an example, open log entries 118 and closed log entries 120 may take the form of alphanumeric structured and/or semi-structured and/or flat or hierarchical text obtained, for example, as a batch, by streaming, from logs, by broadcasting and/or presenting as a spreadsheet, web-service, database table, plain-text file, and the like. The closed log entries 120 that are generated may be stored in a historical transaction database 124. The open log entries 118 may be stored in an open transaction database 126. The historical transaction database 124 and the open transaction database 126 may be any type of one or more systems or devices capable of efficiently storing and retrieving information from memory.

The closed log entries 120 may be provided to the processing engine 104. The processing engine 104 may perform choice-based stratified sampling of the closed log entries 120. In addition, the vectorization module 104 may perform analysis and modification of the closed log entries 120. The processing engine 104 may include the preprocessing engine 132 and the log entry representation engine 134 to generate vector representations of the closed log entries 120 as compacted closed log entries 136. Each of the closed log entries 120 are attached to a category (e.g. have a category assigned), which was included in the historical log entries 110. Therefore each of the compacted closed log entries 136 received by the categorization engine 106 include a category identifier that has been pre-assigned as part of the historical transaction data 112.

Categorization—A computer based process by which predetermined categories are initially assigned or iteratively confirmed or re-assigned to the open log entries 118 by the categorization engine 106. The categorizations are initially assigned or iteratively re-assigned by associating a category identifier with respective open log entries 118. Assignment and re-assignment of category identifiers may be based on statistical associations between open log entries 118 that group one or more open log entries 118 into a respective category. Computer-based categorization of the open log entries 118 by the categorization engine 106 may be implemented with a dynamic learning engine 138 by, for example, explicitly stated decision logic, rules based on similarity or dissimilarities between attributes of open log entries 118 and closed log entries 120, computationally inferred links between open log entries 118 and closed log entries 120 and/or attributes of open and closed log entries 118 and 120. In other examples, computer based categorization of the open log entries 118 may be based on thematic and/or objective and/or subjective relationships between open and closed log entries 118 and 120.

The entire set of closed log entries 120 derived from the historical transaction data 112 are compacted by (1) filtering irrelevant noisy misleading historical log entries 110 via the filtering engine 102 and (2) an efficient vector representation of the filtered transactions (e.g. the closed log entries 120) via the processing engine 104. All the closed log entries 120 derived from the historical log entries 110 are attached to a category previously assigned as part of the historical data. The open log entries 118 may be provided from new transaction data 116 without including a categorization, meaning the open log entries 118 are not yet attached to a category. The compacted set of closed log entries 136 may be stored as part of a reference dataset in a modeling database 140. The reference dataset included in the modeling database 140 is used by the categorization engine 106 to build a statistical model for classifying open log entries 118. The compacted set of closed log entries 136 may be appended by adding verified priority log entries to update a statistical model 142 included in the categorization engine 106.

The types of processes used by the categorization engine 106 to determine the categories may include leveraging the results of supervised learning 128 and/or unsupervised learning 130 performed by the filtering engine 102. Categorization by the categorization engine 106 may also be based on reference to decision trees, support vectors, discriminant functions, and/or any statistical relationship between input variables and target variables, such as pre-processing 132 and log entry representations 134 provided by the processing engine 104.

Cluster—Computer-based formation of statistical associations between historical log entries 110 that bring one or more historical log entries 110 into a group. Clusters may be determined by the filtering engine 102 based on, for example, explicitly stated decision logic, rules based on similarity or dissimilarities between attributes of historical log entries, computationally inferred links between historical log entries and/or attributes, or historical log entries. Alternatively, or in addition, computer-based clustering by the filtering engine 102 may be based on, for example, thematic and/or objective and/or subjective relationships between closed log entries 120.

The types of processes performed by the filtering engine 102 to determine the clusters include unsupervised learning 130. In unsupervised learning 130, clusters may refer to cluster associations, outliers, density estimates, and any other statistical relationship between the similarity or dissimilarity between one or more open log entries 118.

Groupings—Computer based statistical associations between log entries that bring one or more log entries into a group. Groupings may be performed by the filter engine 102 during filtering of the historical log entries 110 to generate the closed log entries 120. Groupings may also be performed by the categorization engine 106 during assignment of a predetermined category to a respective open log entry 118. Groupings of historical log entries 110 may be determined by the filtering engine 102 based on supervised learning 128 or unsupervised learning 130 to provide classifications or clustering, respectively. Groupings of the historical log entries 110 may be determined by the filtering engine 102 based on, for example, explicitly stated decision logic, rules based on similarity or dissimilarities between attributes of the historical log entries 110, computationally inferred links between historical log entries 110 and/or attributes, or historical log entries 110. Alternatively, or in addition, computer based groupings may be based on, for example, addition, thematic and/or objective and/or subjective relationships between historical log entries 110.

Groupings may also be similarly performed by the categorization engine 106 during assignment of a predetermined category to a respective open log entry 118. Groupings may be determined by the categorization engine 106 based on, for example, explicitly stated decision logic, rules based on similarity or dissimilarities between attributes of the open log entries 118 and/or closed log entries 120, computationally inferred links between open log entries 118 and/or closed log entries 120, and other forms of comparison of the open log entries 118 to the closed log entries 120. Alternatively, or in addition, computer based groupings may be based on, for example, addition, thematic and/or objective and/or subjective relationships between open log entries 118 and closed log entries 120.

Figure 2:
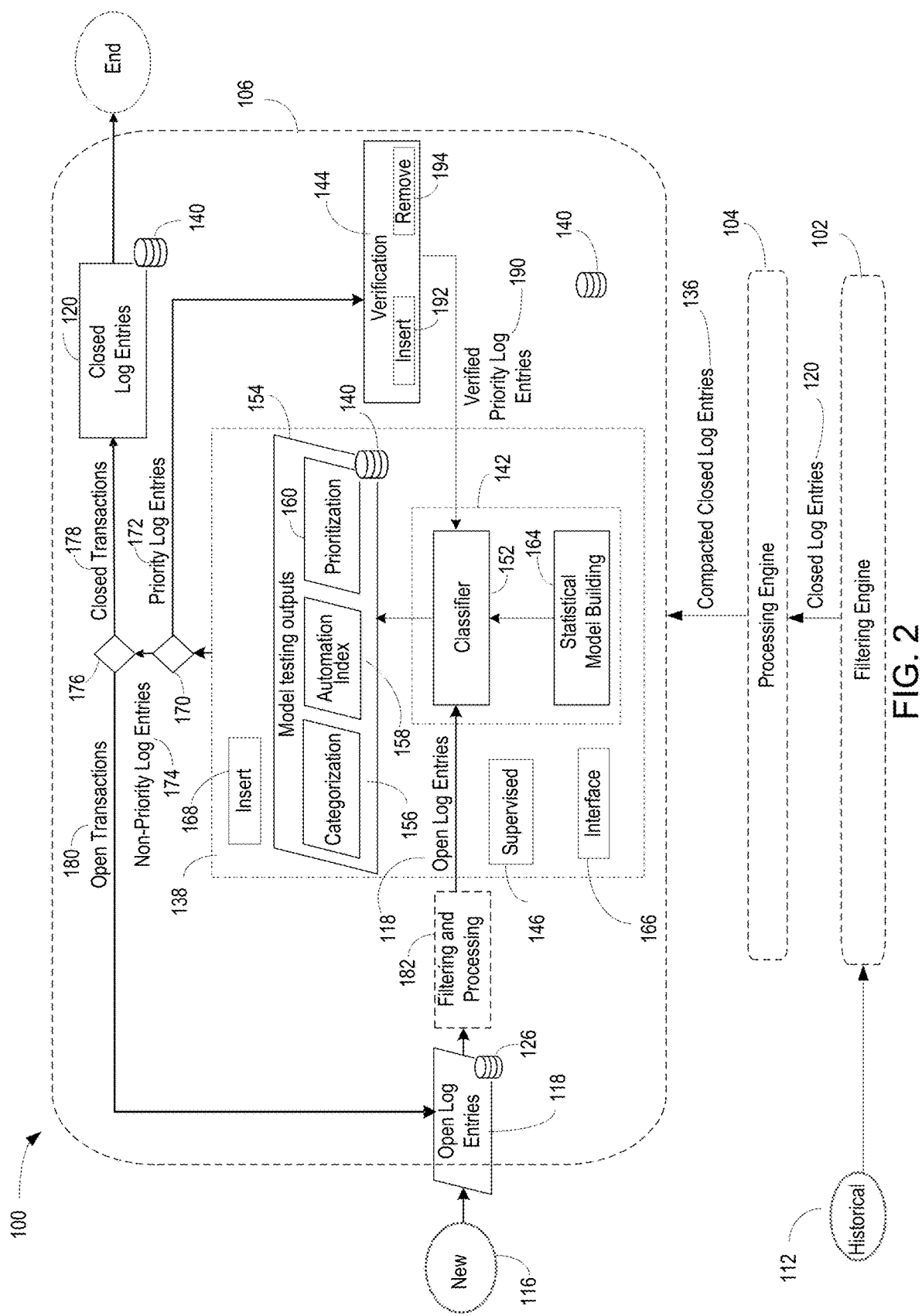
FIG. 2 is a block diagram of an example of a categorization engine included in the identification and management system for log entries.

FIG. 2 is a block diagram illustrating an example of the categorization engine 106 included in the identification and management system 100 for log entries.

Categorization Quality Metrics—A set of one or more criteria used by the categorization engine 106 for assessing or optimizing the quality of the categorization of open log entries 118. Categorization quality metrics may include (a) For supervised learning 146 performed by the dynamic learning engine 138 included in the categorization engine 106: Accuracy, precision, recall, specificity, sensitivity, and the like, and (b) For active learning performed by the dynamic learning engine 138 included in the categorization engine 106: Rate of increase of a relevant supervised quality metric for every queried open log entry 118.

Ground Truth—Categorized historical log entries 110 that are filtered are stored as closed log entries 120 in the reference dataset included in the modelling database 140 to be used by the statistical model 142 included in the dynamic learning engine 138. The closed log entries 120 include a category identifier that is confirmed to be accurate. The ground truth may be an indicator to indicate the categorization of the respective closed log entry 120 has been accuracy verified as belonging to the indicated category. Confirmation of accuracy of the categorization of a closed log entry 120 in order to set the ground truth indicator as true may be rules-based, logic-based, or by an external quality control system accessible through the interface 166. Referring to FIGS. 1 and 2, any ground truth indicators present in the historical log entries 110 of the historical transaction data 112 may be messy, contradictory and confusing. These problems might have been generated due to collation of historical log entries 110 from various data sources under various operating conditions at various points in time. Therefore, transaction removal 122 by the filtering engine 102 may identify and remove outliers within the ground truths of the historical log entries 110. For those closed log entries 120 that have been generated after filtering the historical log entries 110 by the filtering engine 102, the ground truth indicator is considered relatively trustworthy and is used as part of the reference dataset 140 by the statistical model 142 to discern the statistics of the ground truth indicator.

Supervised Learning—Given examples of closed log entries 120 stored as part of a reference database, and their associations to a target attribute (such as a class label in a closed log entry 120), the filtering engine 102 and/or the statistical model engine 106 may perform supervised learning 128 and supervised learning 146, respectively, to predict, estimate, infer, compute, or decide associations of a historical log entry 110 or an open log entry 118 where that target attribute is unknown and/or missing. For example, the filtering engine 102 may use supervised learning 128 to identify groups and generate closed log entries 120 from historical log entries 110 included in the historical transaction data 112 that do not include a target attribute such as a cost categorization based on examples of cost categorizations of general ledger entries included in the historical transaction data 112. In another example, the categorization engine 106 may include a classifier 152 that uses supervised learning 146 and statistical sampling to identify groups and assign predetermined cost categories to new open log entries 118 based on other open log entries 118 having a cost category assigned by, rules or external systems, which are included in other open log entries 118. The classifier 152 may output model testing outputs 154 for each of the open log entries 118, which may include an assigned categorization. In addition to generating and outputting assignment of the categorization 156 for each of the open log entries 118, the classifier 152 also performs statistical sampling to output an automation index 158 (discussed later) and prioritizations 160 for each of the open log entries 118. In other examples, fewer or additional model testing outputs 154 may be output by the classifier 152. The model testing outputs 154 may be stored in the reference dataset in the modeling database 140.

For supervised learning 128 and 146, categorizations 156 output by the classifier 152 may refer to the statistical relationships between the input variables and target variables, which may be developed by statistical sampling with a statistical model building engine 164 included in the statistical model 142. Categorizations for supervised learning 146 may be based on, for example, estimated decision trees, decision boundaries, support vectors, linear or polynomial hyperplanes separating, and their summary statistics where the estimation optimizes one or more relevant categorization quality metrics, such as, accuracy, precision, recall, false-positive rate, specificity, and sensitivity, such as precision, recall or F-score. In an example of categorization 156 of cost of financial open log entries 118, the input variables may include a general ledger description, vendor information, a cost center hierarchy description, and the like, whilst the target variable may be a predetermined standard cost category. Categorizations may be based on the operation of the statistical model building engine 164 to develop the classifier 152 and may include, for example, a random forest, stochastic gradient descent classifier or support vector machine estimated from a dataset of pre-existing cost-categorization of financial open log entries 118.

Unsupervised Learning—The unsupervised learning 130 performed by the filtering engine 102 may use: (b.1) Cluster quality metrics such as Dunn Index, Silhouette Coefficient, and the like, (b.2) density evaluation metrics such as KL divergence, Likelihood, Mutual Information, and the like, and (b.3) outlier detection metrics such as Mahalanobis Distance, Local Outlier Factor, and the like, to discover groups or individual log entries that are outliers and abnormalities that can be eliminated. Based on a set of available attributes, two or more similar historical log to build the model, as disctransaction data 112 or closed log entries 120 may be clustered together while separating out one or more dissimilar historical log entries 110 or closed log entries 120 to optimize some quantitative and/or qualitative criteria within some implicit and/or explicit constraints. For example, during unsupervised learning 130 by the filtering engine 102 the filter engine 102 may: (1) identify historical log entries 110 or closedclosed log entries 120 who are outliers with respect to a predetermined criteria, such as a Spearman correlation of prominent words used to describe the respective historical log entries 110 or closedclosed log entries 120; (2) identify clusters of historical log entries 110 or closedclosed log entries 120 who are similar with respect to relative volume of a common variable value, such as predetermined categories. For unsupervised learning 130, groupings may refer to the statistical relationships between clusters of data samples, where the number of clusters may be determined arbitrarily or with some suitable grouping quality metrics, such as by active learning.

Active Learning—learning is a strategy to select open log entries 118 for verification and categorization such that those open log entries 118 maximize the average or median automation index of a group of the open log entries 118.

Word Support—Word support is calculated by the classifier 152 as the ratio of words present in an open log entry 118 that are also present in the reference dataset stored in the modeling database 140, and are used by the statistical model 142 to generate the categorizations.

Automation Index—For each open log entry 118, when category is assigned, an automation index 158 is also calculated and output by the classifier 152 included in the dynamic learning engine 138. The automation index may be a monotonically increasing function of the product of (1) the probability of the open log entry 118 belonging to the assigned category and (2) the word-support for the open log entry 118.

Prioritization—An active learning strategy performed by the dynamic learning engine 138 to generate and output a prioritization 160 for each of the open log entries 118. The dynamic learning engine 138 may select and/or filter and/or sort and/or perform ranking of open log entries 118. Following categorization 156 and determination of an automation index 158, the prioritization 160 may be generated as an output of the classifier 152 across groups of open log entries 118, such as open log entries 118 assigned the same category. Open log entries 118 identified as having a high priority may be reviewed for accuracy of processing by the statistical model 142 to assign the categorization. The prioritization may be performed iteratively by the statistical model 142 each time the model categorization is assigned or re-assigned for each of the open log entries 118 so that the average automation index of all open log entries 118 is maximized.

Quality Control—Rules-based, statistical, expert-driven, automated or external review and/or editing of historical log entries 110 by the verification engine 144 that may result in corrections and/or confirmations of the categories assigned to one or more open log entries 118. External review and/or editing of historical log entries 110 may be via the interface 166.

Figure 3:
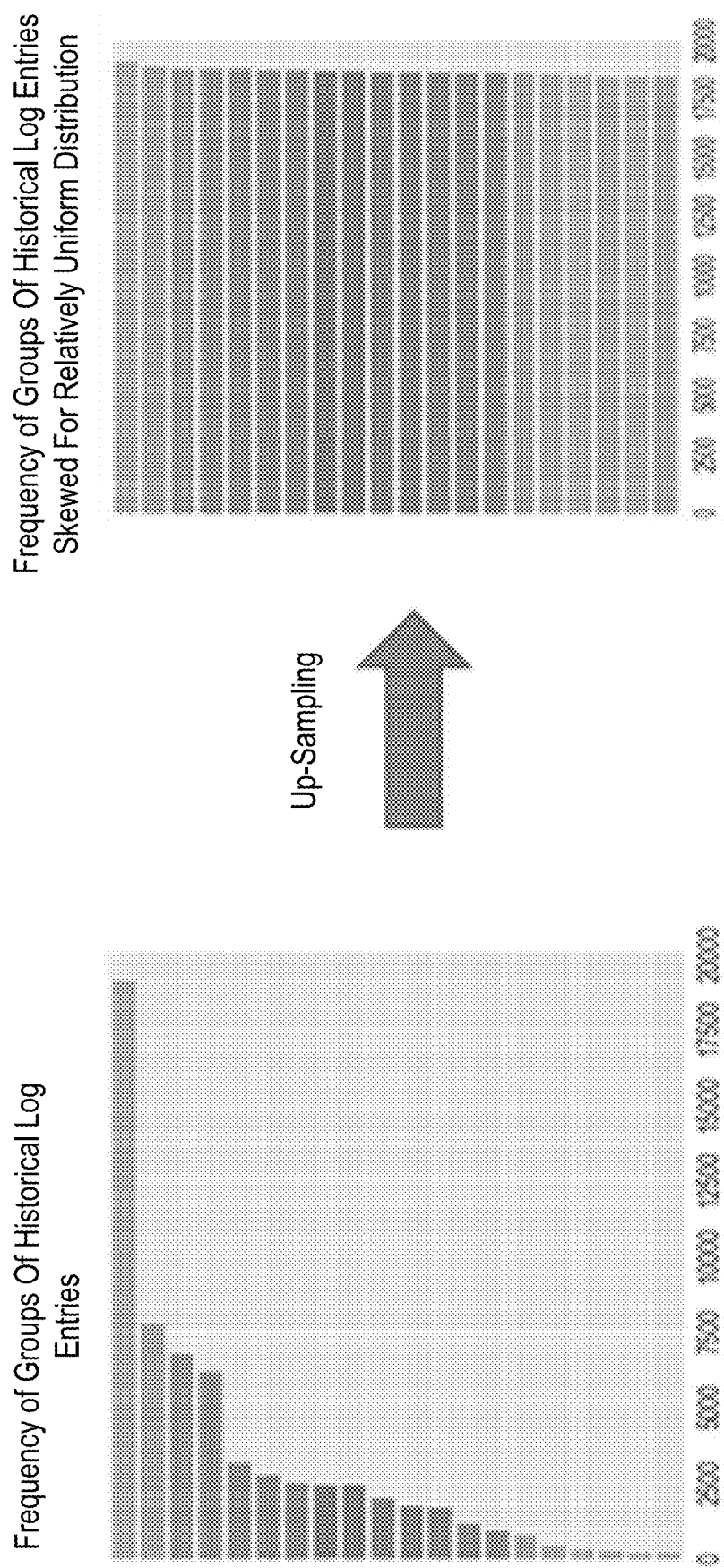
FIG. 3 represents an example of an up-sampling strategy designed to change the skewed distribution of frequency of groups of log entries into a relatively uniform-distribution.

Up-Sampling—A statistical sampling method performed with the statistical model building engine 164 to develop the classifier 152 involving randomly or systematically repeating samples from less populous categories until all the categories have approximately the same sample size as the largest category. FIG. 3 represents an example of an up-sampling strategy designed to change the skewed distribution of frequency of groups of historical log entries into a relatively uniform-distribution. Although this sampling method usually gives the most optimal categorisation quality metrics, it also exponentially increases the computational complexity of many categorisation statistics such as mean, covariance, probability distributions, modelling for supervised learning.

Down-Sampling—A statistical sampling method performed with the statistical model building engine 164 to develop the classifier 152 involving randomly or systematically removing samples from dominant categories until all the categories have approximately the same sample size as that of the smallest category. Although it is a very computationally effective method, it may result in information loss from the dominant categories.

Choice-Based Sampling—Suppose categories of historical log entries are built on a common set of characteristics. When the size of a category is much larger than other categories (underpopulated categories), statistical modelling performed with the statistical model 142 in order to distinguish the categories from one another may suffer because the characteristics of the underpopulated categories may be inadequately captured. This may affect the robustness statistics of closed log entries 120 or open log entries 118 in many scenarios. For example: (1) For supervised learning, if categories are built with supervised learning 128 and 146 based on class labels, and a class label is present in the closed log entries 120 or the open log entries 118 significantly more frequently than other class labels, then the definition of decision boundaries between the classes may be skewed by the dominant class, (2) For unsupervised learning 130 in the filter engine 102, if clusters are built on within-cluster density and a cluster is sparse, then the separation of clusters may be ambiguous. (3) For active learning, if a queried sample is based on frequency counts and not on the queried sample's ability to disambiguate the decision boundaries, then the categorisation quality metrics need not be optimized for every queried sample.

Figure 4:
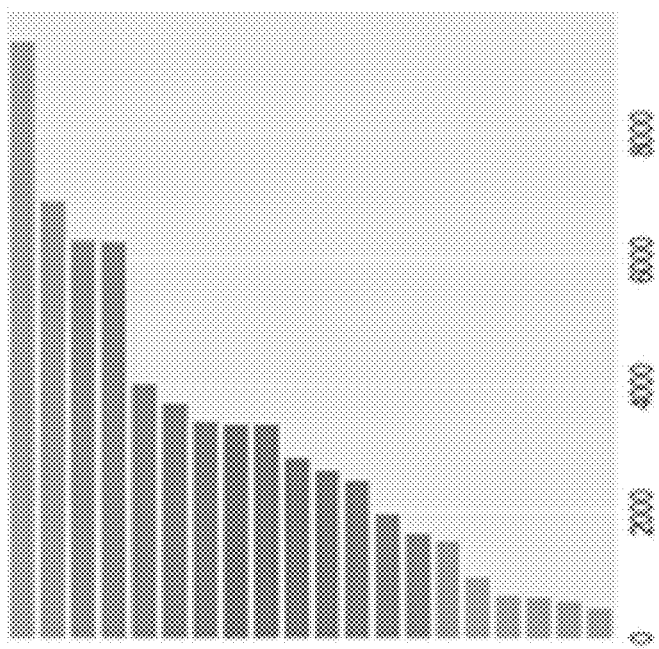
FIG. 4 represents an example of choice-based sampling, which may involve down-sampling the dominant groups and up-sampling the minor groups of log entries.
Figure 4:
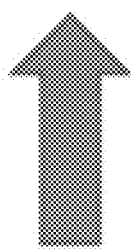
Figure 4:
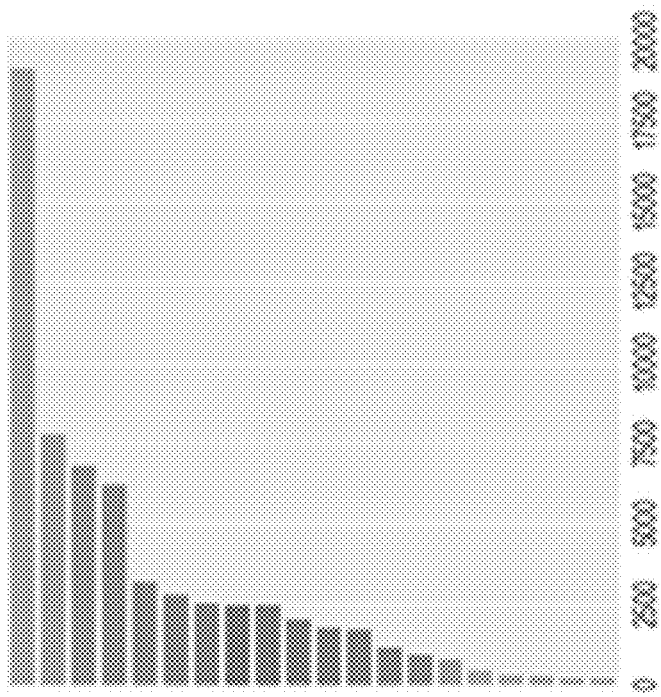

Resampling strategies performed with the statistical model 142 may address the category-imbalance problem by artificially changing the frequency of training samples in each category. Choice-based sampling may involve down-sampling the dominant categories and up-sampling the minor categories. FIG. 4 represents an example of choice-based sampling, which may involve down-sampling the dominant groups and up-sampling the minor groups of historical log entries. It is computationally inexpensive and may improve the representation of less-dominant categories. Both up-sampling and down-sampling strategies are designed to change the skewed distribution of the frequency of the categories into a relatively uniform-distribution. Choice-based sampling changes the skewed category frequency distribution into a more balanced representation of the categories without incurring excessive computational complexity. This may be achieved by using a weighted-transformation of the frequency of the categories to correct for any selection bias.

The system 100 may include a processor configured to filter historical transaction data 112 using the filtering engine 102 to remove inconsistent log entries or exception log entries and generate a plurality of closed log entries 120. In addition, the processor may add a token to each of the closed log entries 120. The token may be associated with a respective word in a respective closed log entry 120 and may be representative of a source of origin of the word. The processor may also execute the dynamic learning engine 138 to assign one of a plurality of predetermined categories to each of the open log entries 118 in accordance with the token and the reference dataset 140 stored in the database. In addition, the processor may execute the dynamic learning engine 138 to generate an automation index 158 for each of the historical log entries. The automation index 158 may be a value indicative of accuracy of the predetermined category assigned to a respective open log entry 118.

The processor may also identify only some of the open log entries 118 as priority log entries 172. The priority log entries 172 may be identified based on the statistical sampling performed with the statistical model 142. The statistical sampling may, among other things, identify groups of open log entries 118 and provide the automation index 158 for each of the open log entries 118. The priority log entries 172 may be identified based on the automation index 158 and/or based on being representative of a group of the open log entries 118 identified via the statistical sampling. Each of the priority log entries 172 may be independently analyzed for accuracy of assignment of one of the predetermined categories by the processor executing the dynamic learning engine 138. In addition, the processor may change a respective predetermined category assigned to at least one of the priority log entries 172 and store the priority log entries as part of the reference dataset 140 that includes the closed log entries 120. The dynamic learning engine 138 may be iteratively trained by appending the closed log entries 120 with the priority log entries 172.

Following at least some of the iterative training, the processor may execute the dynamic learning engine 138 to re-evaluate and re-assign the predetermined categories to each of the open log entries 118 based on the token, the reference dataset, and the change to the respective predetermined category assigned to at least one of the priority log entries. The processor may also be configured to revise the automation index 158 for each of the open log entries 118 and store at least one of the previously open log entries 118 as a closed log entry 120 as part of the reference dataset 140 based on the automation index 158 being above a predetermined threshold.

Figure 5:
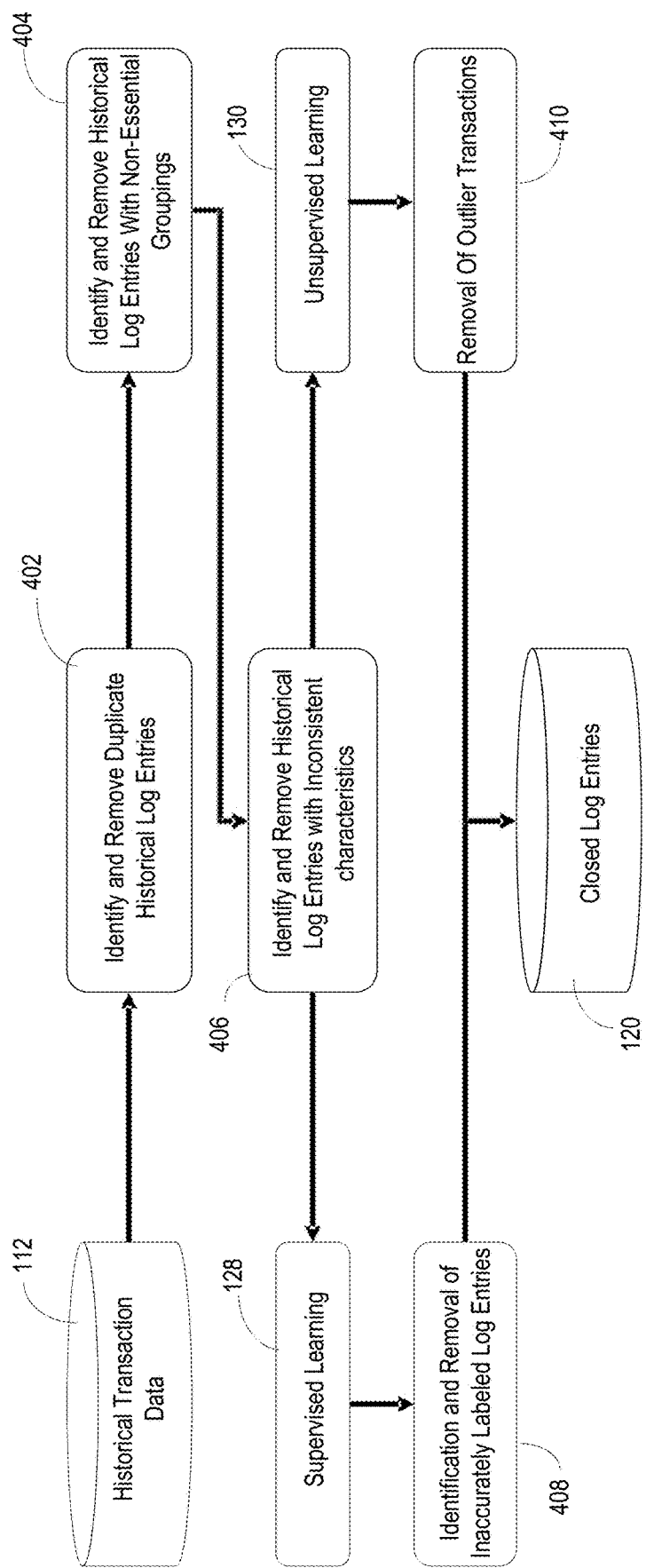
FIG. 5 is an operational flow diagram illustrating an example of filtering of historical data to generate log entries.

FIG. 5 is an operational flow diagram illustrating an example of filtering of historical transaction data 112 to generate closed log entries 120. Referring to FIGS. 1, 2 and 5, example operation of the filtering engine 102 (FIG. 1) is illustrated to minimize the computational complexity of statistical learning. The filtering engine 102 is configured to reduce the volume of historical log entries to reduce computational complexity in determining categories.

The filtering engine 102 may remove historical log entries 110 that are akin to another existing or selected historical log entry 110 according to some suitable criteria within a set threshold. (402) Suitable criteria may be, for example, (a) duplicates on one or more fields of origin of the words, (b) string similarity is lower than a normalized Levenshtein distance threshold, such as lower than 0.9. In an example, the filter engine 102 may identify and remove duplicate historical log entries 110, and those historical log entries 110 that are identified as being substantially the same based on the number of common word terms, or any other criteria for identifying historical log entries 110 that have similar content and features.

The transaction removal engine 122 may remove non-essential groupings and associated historical log entries 110. (404) Non-essential groupings and associated historical log entries 110 may be removed by, for example, removing historical log entries 110 or groups that are beyond a distance from the median or centroid, based on:

Correlation along relevant attributes of historical log entries 110 that in practice could confuse a human expert. For example the correlations may be based on top-words in terms of volume in each of the historical log entries 110 in respective groups. For example, the clusters may be formed by Spearman's Rank Correlation of similar log entries, which highlights groupings of log entries with similar characteristics (for example words). Such correlations may be developed and used by the filter engine 102 to reveal potential misclassification and outliers.

Singular values along the dimensions of the vectorized closed log entries 120.

The transaction removal engine 122 may remove historical log entries 110 that are inconsistent along a characteristic (e.g., class label) while the rest of the characteristics remain the same. (406)

Referring still to FIGS. 1 and 4, historical transaction data 112, which includes log entires 110 may be processed by the filter engine 102. During operation to filter the historical transaction data 112 and generate closed log entries 120, historical log entries 110 may be identified and removed by the transaction removal engine 122 using supervised learning 128 and unsupervised learning 130.

For example, using supervised learning 128, historical log entries 110 that are misclassified or poor precision and/or recall when tested and/or cross-validated using supervised learning 128 with a model such as a statistical model. The model for supervised learning 128 may be built and trained based on the historical log entries 110 in the historical transaction data 112. In examples, inaccuracies in the training data of the model for supervised learning 128 may be present due to human error, fatigue or ineptitude of data entry in the historical transaction data 112. Thus, the labels contained in the historical log entries 110 may be identified as inaccurate and removed. (408)

In an example of unsupervised learning 130, historical log entries 110 may be determined as outliers during operation in association with a model for unsupervised learning 130, such as a statistical model. The model for unsupervised learning 130 may be used for different applications, such as:

Hierarchical clustering based on similarity between historical log entries 110 in the historical transaction data 112. Similarity between historical log entries 110 may be measured based on proximity of different historical log entries 110, such as using, for example, Levenshtein distance, Jaro-Winkler distance, or other proximity based determination mechanism.

Historical log entries 110 that are not identified from the model as forming part of any significant clusters may be considered as outliers, and can therefore be excluded from the historical data to improve robustness of the categories. The most significant groups of historical log entries 110 may be used for transaction prioritization in active learning performed by the categorization engine 106.

Outliers present in the historical log entries 110 may be identified and removed by the transaction removal engine 122. (410) For example, the transaction removal engine 122 may perform Principal Component Analysis to identify outliers. In addition, historical log entries 110 which are outside of clusters identified with the model for unsupervised learning 130 may be excluded. In an example, such outliers and may be determined by using Principal Component Analysis (pca) on vectorized representations of the closed log entries 120.

One or more categorization quality metrics, such as an average F-score, may also be used to include or exclude a certain cluster of historical log entries 110 or cluster of characteristics of the historical log entries 110, such as, for example, client or geography or cost category. Examples of hierarchical clustering of a grouping quality metric across various groups include an importance classification, such as a term importance classification for terms included in a group of historical log entries 110 in comparison of other groups of historical log entries 110. Such term importance may be used to create weighting factors for different word terms present in closed log entries 120. In addition, a grouping quality metric may be used, for example, an F1-Score may be determined for terms in the historical log entries 110 to subsequently predict the cost category for closed log entries 120 of a new client. In an example, various groups, such as various groups of cost categories may be arranged along a vertical axis, and various datasets such as new client identifiers may be arranged along a horizontal axis of a plot graph to develop a heat map identifying historical log entries 110 with strongly and poorly perfoming grouping metrics so that the poorly performing groups of historical log entries 110 may be excluded from the historical data before the closed log entries 120 are generated. Datasets with poorly performing grouping quality metrics (such as due to outliers or poor F1-Score along several subcategories) may be excluded to improve computational efficiency in determining the groupings of the remaining historical log entries 110. In another example, term importance for a particular transaction group in comparison to all other groupings may be plotted and analyzed. For example, for a group of historical log entries 110 for a group "3rd Party Labor," terms such as "gmbh" and "maintenance" may be identified as prevalent in the historical log entries 110 and therefore may be treated as having high importance and weighted accordingly. For vectorization of closed log entries 120 by the processing engine 104, term weighting may be important for accurate classification.

Figure 6:
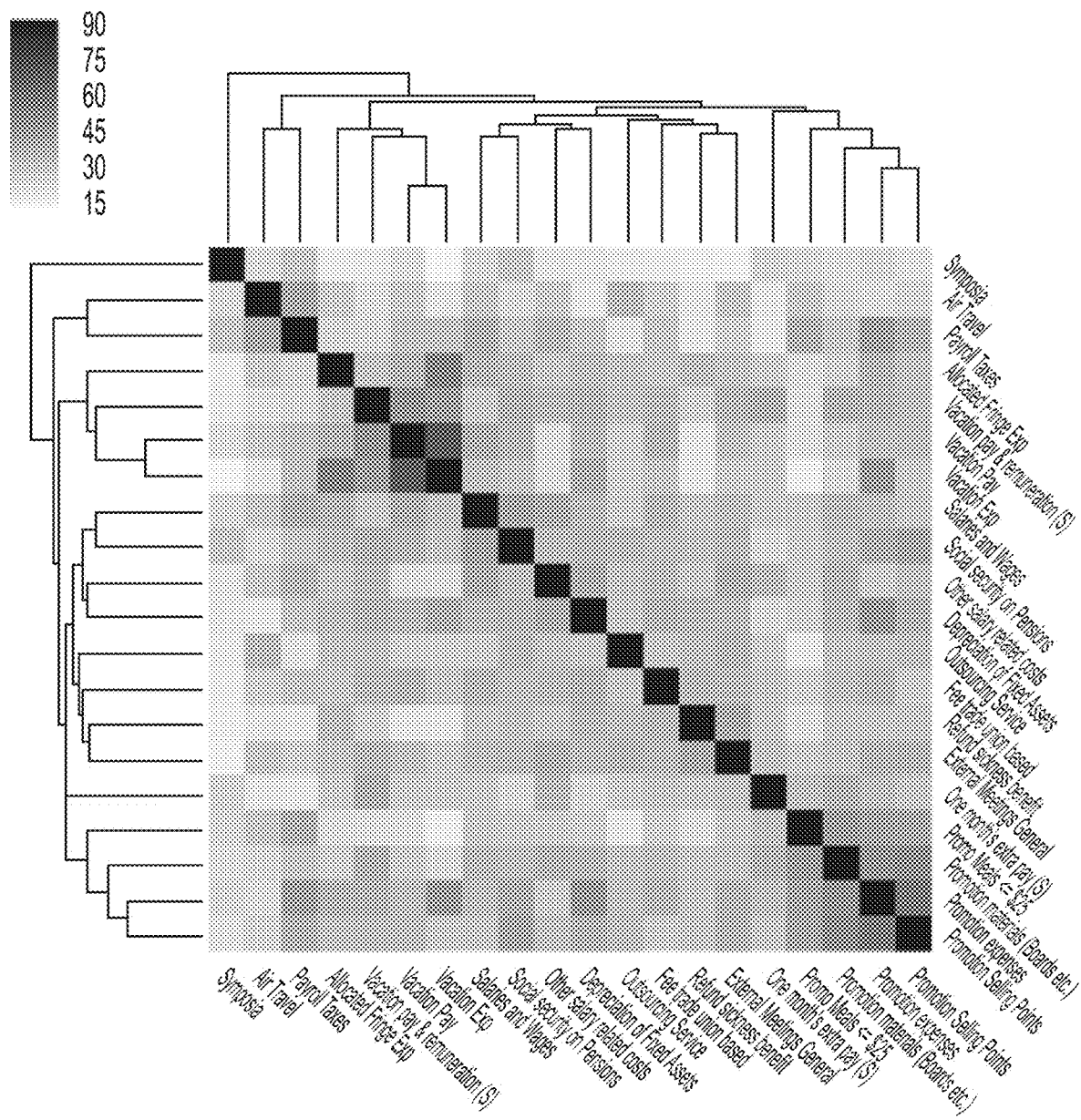
FIG. 6 is an illustration of an example of groupings of log entries discovered by performing hierarchical clustering.

Cleaning of historical log entries 110 may also be performed by the transaction removal engine 122 to standardize the semi-structured historical transaction data 112. Such cleaning may include, for example:

Removal of punctuation
Conversion to lower case
Removal of leading or trailing whitespaces
Retention of words with a minimum length of 2
Removal of stopwords FIG. 6 is an illustration of an example of groupings of historical log entries discovered by performing hierarchical clustering. In the example of FIG. 6, the grouping of transactions may be discovered by performing hierarchical clustering of simularities among the historical log entries 110. For example, hierarchical clustering of simularities may be performing using levensthein ratio of words in the different historical log entries 110. In FIG. 6, examples of categories are provided along "x" and "y" axis and the locations in the plot represent a number of log data entries identified as coming within the categories based on text or text strings within the respective historical log entries 110. Categories with higher numbers of historical log entries 110 are illustrated as being darker shaded blocks, whereas categories with fewer numbers of log entries are illustrated as being lighter shaded blocks. In an example, during unsupervised learning, the clusters may be developed or created for the historical log entries 110 by the transaction removal engine 122 calculating a number of changes in words or terms that are needed between historical log entries 110 to make the historical log entries 110 the same or substantially similar. Thus, in FIG. 6, the darker blocks may represent historical log entries 110 that do not require many changes to reach substantial simularity and the lighter log entries represent historical log entries 110 where significant or substantial changes are needed to align terms in disparate historical log entries 110. Such grouping based on the clustering may be used to identify priority log entries. In addition, duplicate historical log entries 110 may be identified and removed based on the clustering.

The filtering engine 102 may filter historical transaction data 112 using the transaction removal engine 122 to remove inconsistent historical log entries 110 or exception historical log entries 110. During this process, the transaction removal engine 122 may identify historical log entries 110 with existing labels and historical log entries 110 without existing labels. The transaction removal engine 122 may perform supervised learning 128 to group historical log entries 110 with existing labels and perform unsupervised learning 130 to cluster historical log entries 110 that do not include existing labels. For historical data that includes a group label, the transaction removal engine 122 may identify dominant groups having the same group label, or the transaction removal engine 122 may perform unsupervised learning to generate clusters of historical log entries based on dominant shared features of the log entries in the historical data.

In addition, or alternatively, the filtering engine 102 may deem some of the historical log entries 110 as exceptions during querying of the historical log entries 110 in an active learning process by the transaction removal engine 122. Such exceptions may be maintained in the historical transaction data 112. Based on the historical log entries 110 still remaining in the historical transaction data 112, the filtering engine 102 may generate the closed log entries 120. The closed log entries 120 may be processed by the processing engine 104.

Figure 7:
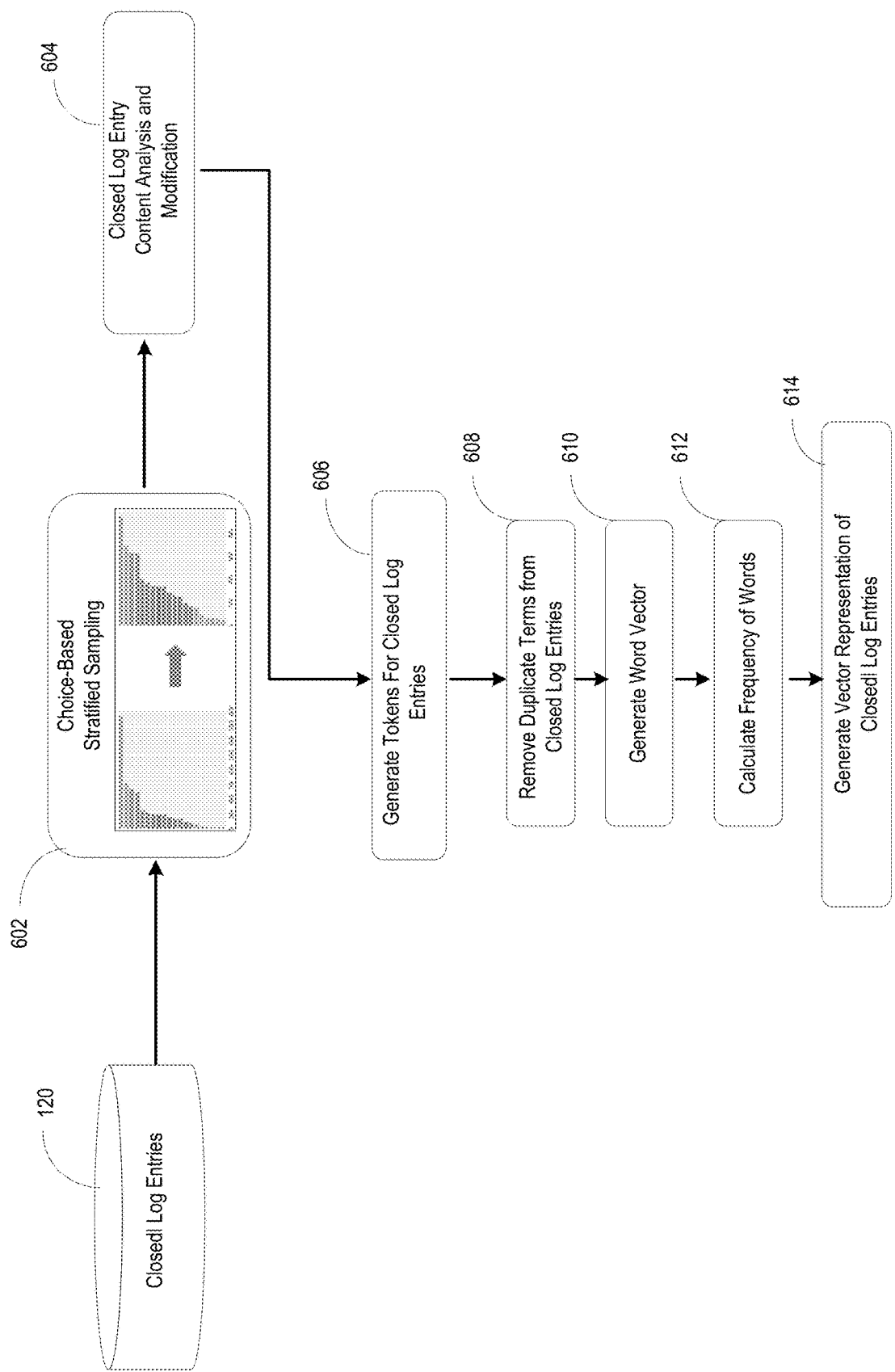
FIG. 7 is an operational flow diagram illustrating an example of vectorization of log entries.

FIG. 7 is an operational flow diagram illustrating an example of vectorization of closed log entries 120. Referring to FIG. 7 and FIGS. 1 and 2, example operation is illustrated to perform statistical sampling and efficient vector-representation of closed log entries 120. The vectorization module 104 may perform choice-based stratified sampling of closed log entries 120 as illustrated and discussed with reference to FIG. 3 using the preprocessing engine 132. (602) The choice-based stratified sampling of closed log entries 120 may be corrected by the preprocessing engine 132 for any selection bias towards dominant categories based on (a) the frequency of a target variable used in supervised learning and (b) the dominant clusters based on the density of the clusters formed in unsupervised learning.

For example, sampling may be carried out by the pre-processing engine 132 using a sampling function with replication where the inputs to the function may be sampling weights and total number of samples. In another example for supervised learning, sampling weights may be calculated by the pre-processing engine 132 using a choice-based sampling strategy as follows:

The frequency count per target class may be divided by the total frequency count of the historical transaction data 112 followed by an inverse transformation to produce an inverse frequency percentage weight per target class.

A base N log transformation may then be applied to the inverse frequency weights to produce a list of weights per target class to be used by the sampling function.

In another example, sampling may be applied to address a large class imbalance (frequency count per category) present in the closed log entries 120. Sampling may be carried out using a sampling function with replication. Inputs to this function may be sampling weights and total number of samples. Sampling weights may be calculated as follows:

The frequency count per category may be divided by the total frequency count of the historical data database followed by an inverse transformation to produce an inverse frequency percentage per category.

A log transformation may be applied to this inverse frequency to produce the final list of weights (which may be one per category) to be used by the sampling function.

The vectorization module 104 may also perform analysis and modification of the closed log entries 120 using the preprocessing engine 132. (604) Analysis and modification of the closed log entries 120 may be performed to prepare the closed log entries 120 for vectorization. Text included in each of the closed log entries 120 may be modified or otherwise processed to improve data content quality. For example, the preprocessing engine 132 may apply a whitelist to preserve special combinations of characters, abbreviations, conflicts between stop words and valid words, conflicts between a dictionary of any two languages, and the like. In addition, or alternatively, the preprocessing engine 132 may also apply a blacklist to eliminate stop words, non-natural language words, codes, numbers, non-human language characters, and the like.

The pre-processing engine 132 may also de-sensitize alphabetic character cases. An example of closed log entries 120 after pre-processing with the pre-processing engine 132 is presented in Table 1.

TABLE 1

AN EXAMPLE OF HISTORICAL LOG ENTRY PREPROCESSING

| ID | Original Transaction Information | Processed Transaction Information |
|---|---|---|
| 1 | Business - Accounts_meals * deductible accounts. | business accounts meals deductible accounts |
| 2 | Am-Capex Business + Transition Accounts | am capex business transition accounts |

The log entry representation engine 134 may generate a token to represent a source of origin of words included in the closed log entries 120. (606) The token may be added to respective closed log entries 120 as a separate data field. The tokens may be associated with one or more respective words in a respective closed log entry 120. Words within a closed log entry 120 may originate from different fields of origin and/or hierarchy within the historical transaction data 112. Such words may be selected for identification of origin and/or hierarchy, by attaching or associating a field of origin token. The token may, for example, be a prefix, a suffix, a scope-identifier, and the like, which may be generated and associated with one or more respective words based on the respective words' hierarchy and field of origin. Tokens may be selectively generated for each of the closed log entries 120. The token may be indicative of an origin of a word included in a respective closed log entry 120, and may be stored in a field in the database 124 in association with a word in the respective closed log entry 120.

Table 2 is an example of closed log entries 120 in which pre-processing by the pre-processing engine 132 is performed, followed by the generation and addition of tokens in the closed log entries 120. The tokens have been generated and associated with words in the closed log entry 120 by being added as a field in the respective closed log entry 120. In Table 2, the examples of the closed log entries 120 include multiple hierarchical levels and text is stored in different fields. Hierarchical levels may be present in the historical transaction data 112, or, for example, may be determined and assigned by the pre-processing engine 132. As illustrated in the "Processed Transaction Information" field of Table 2, each of the selected terms has a generated token representing a field of origin and/or hierarchy. For example, the term "business" is associated with a token of "1.1" to indicate that the term "business" originated from level 1 and field 1 of the historical transaction data 112. In other examples, any other form of information may be generated in a respective token and added to respective closed log entries 120 as part of the vectorization process.

TABLE 2

AN EXAMPLE OF HISTORICAL LOG ENTRY PREPROCESSING AND TOKEN ADDITION

| ID | Level 1, Field F1 | ... | Level N, Field M-1 | Level N, Field M | Processed Transaction Information |
|---|---|---|---|---|---|
| 1 | Business - Accounts_ meals * deductible accounts. | | | Acme & Friends Co. Ltd. | 1.1.business 1.1.accounts 1.1.meals 1.1.deductible 1.1.accounts N.M.acme N.M.friends N.M.co N.M.ltd |
| 2 | Am-Capex Business + Transition Accounts | | Clearance @23 | | 1.1.am 1.1.capex 1.1.business 1.1.transition 1.1.accounts N.M-1.clearance |

The tokenized words in a historical log entry may be merged by the log entry representation engine 134 to speed-up the processing of the historical transactions. This speed up in processing may be achieved by the reduction in the amount of information that the log entry representation engine 134 must process. Thus, the function of the underlying computing hardware may be improved by the addition of tokens to the closed log entries 120. The tokens allow the minimization of the size and complexity of the data in the historical log entries thereby advantageously reducing computing requirements and storage requirements of the underlying computing hardware. In addition, the tokens provide the capability to efficiently and accurately establish groupings that would otherwise be unavailable, which may reduce computing complexity and overall processing requirements for the underlying computing hardware. Further, the addition of a field containing a token enhances the grouping capability in ways that are unavailable without the addition of the tokens in the closed log entries 120.

Further efficiency in processing may be achieved by the log entry representation engine 134 removing duplicate words within and across all closed log entries 120. (608) In addition, the log entry representation engine 134 may remove miscategorised priority log entries based on computer based logic analysis of the token and the miscategorised priority log.

The log entry representation engine 134 may generate a word vector using unique words remaining in a respective closed log entry 120 based on the tokens. (610) The vector may be a compacted respresentation of the closed log entries 120. For example, the log entry representation engine 134 may restrict the length of vectors to an appropriate minimum word count to reduce data dimensionality, storage space, complexity, runtime while retaining statistical relevance. Accordingly, the same words in a respective closed log entry 120 having a token indicative of the same origin of the words may be merged in the respective historical log entry. Thus, duplicative words or symbols may be removed from each of the historical log entries 120 prior to generating a respective word vector for each of the historical log entries 120. In addition, a length of the respective word vector may be restricted to a predetermined word count in each respective closed log entry 120 so as to compact the closed log entries 120.

For each closed log entry 120, frequency of occurrence of words with respect to the tokenized words can be generated by the log entry representation engine 134. (612) The frequency of occurrence of words in the closed log entries 120 may be determined by the log entry representation engine 134 calculating a ratio of frequency of occurrence of words.

The log entry representation engine 134 may generate vector representations for each of the closed log entries 120. (614) The log entry representation engine 134 may generate a word vector for each of the closed log entries 120, and identify frequency of occurrence of words in each of the closed log entries 120 to create vector representations of each of the closed log entries 120.

An example of the vectorization of closed log entries 120 based on processing of the closed log entry 120 by the pre-processing engine 132 and the log entry representation engine 134 is represented in Table 3. In Table 3, the ID represents an identifier of a respective closed log entry 120. Each of the columns in Table 3 include a value for the number of times a word included at the top of the column is present in the respective closed log entry 120. Thus, in this example, vectorization is based on the frequency unique words appear in the closed log entry 120. In other examples, other parameters or characteristics of the closed log entries 120 may be used in creating respective vectors representative of the closed log entries 120. In yet another class of examples, relative positions of the words within a closed log entry 120 for each transaction in the closed log entry 120 may be used to create vectors representative of the closed log entries 120 in a compacted form. Further, such a table of relative positions may be compressed using matrix transformation methods such as Singular Value Decomposition to form more efficient vector representation of the closed log entries 120.

TABLE 3

AN EXAMPLE OF VECTORIZATION OF HISTORICAL LOG ENTRIES FOLLOWING PRE-PROCESSING AND TOKEN ADDITION.

| ID | 'meals' | 'deductible' | 'am' | 'capex' | 'transition' | 'accounts' | 'business' |
|---|---|---|---|---|---|---|---|
| 1 | 1 | 1 | 0 | 0 | 0 | 2 | 1 |
| 2 | 0 | 0 | 1 | 1 | 1 | 1 | 1 |

In this example of machine learning, choice-based sampling of text-based historical log entries for supervised learning is performed. Also, in this example, encoding, such as with bag-of-words, may be based on the field and/or hierarchy of origin provided by the respective tokens associated with the words. Encoding using the tokens generated and applied to terms in the historical log entries allows the use of different fields per transaction for vectorization without introducing confusion (same word, different origin). In other words, vectorization with the log entry representation 134 may be different where two historical log entries are represented with two different vectors even though they include the same terms, since the terms of the different closed log entries 120 are associated with tokens indicating different origins or hierarchy.

Vectorization of historical training data—Vectorization by the processing engine 104 may be used to perform text classification, with the goal being to produce a numerical representation of each of the closed log entries 120. A Bag of Words (BoW) model may be built containing the list of words present in the statistical modelling input data. Subsequently, the statistical modelling input data may be transformed into a matrix with as many columns as words in the BoW model and with as many rows as lines in the statistical modelling input data. Data values per column and line may then be calculated as the frequency count of the word represented by the respective column for the line. In the building of the BoW model the minimum frequency threshold may be set to 1 which means that no words were filtered out. This may be desirable for default mapping where the number of lines upon which the statistical model is built is large (several hundreds) and thus excluding words with a count lower than 10 considerably reduces the dimensionality of the input data (improved efficiency).

Referring again to FIG. 1, the dynamic learning engine 138 may include the statistical model 142 and the model output 154. The statistical model 142 may include the statistical model building engine 164 and the may assign a category identifier to each of the closed log entries 120 based on the token and a reference dataset included in the database 124. The category identifier independently assigned to each of the closed log entries 120 is indicative of one of a set of predetermined categories and is stored in the database 124 in association with respective closed log entry 120 to which the category is assigned. The classifier 152 may be any form of statistical model capable of assigning category identifiers based on statistical analysis of the closed log entries 120. Assignment of the category identifiers may be based on groupings determined by the classifier 152 using the model for supervised learning 146.

In an example, the classifier 152 may be a Random forest classifier that performs categorization based on a categorization decision tree. Other classifiers such as SVM, logistic regression, etc. are alternatives. Random forest may be used as the classifier 152 due to accuracy of learning algorithms available. Another advantage of the Random forest classifier is the construction which allows processing of high dimensional spaces as well as large number of training examples. In an example implementation, a random forest is implemented as a meta estimator that fits several decision tree classifiers on various sub-samples of the dataset and use averaging to improve the predictive accuracy and control over-fitting. The sub-sample size may be the same as the original input sample size but the samples are drawn with replacement if bootstrap=True (default).

The statistical model building engine 164 may be used to build and iteratively update the model for the classifier 152 based on closed log entries 120 stored as part of the reference dataset included in the database 124. Data used to build the model may be prepared historical transaction data 112 in the form of closed log entries 120. In an example application, the classifier 152 may train on a predetermined predictive variable, such as: GL-Vendor to output a model.

Feature engineering may be used to produce a predictive variable in a predictive variable column of each closed log entry 120 in order to improve accuracy of categorization. The predictive variables used may be based on multiple fields in the closed log entries 120. For example, two fields, such as, GL Account Description and Vendor may be used. These 2 columns may be transformed by adding a token to each of the words per variable to denote their origin (GL Account Description or Vendor) and then the two terms may be merged. The resultant merged field is a predictive variable: GL-Vendor and may be used by the statistical model building engine 164 to build the model.

The classifier 152 may assign one of a plurality of predetermined categories to each of the historical log entries. In an example, the classifier 152 may assign categories to each of the open log entries 118 based on a categorization decision tree. In addition, the classifier may generate a new predetermined category and re-assign at least one of the closed log entries 120 to the new predetermined category. Generation of the new predetermined category may be based on, for example, identification of a grouping of closed log entries 120 with a mean automation index 158 consistently below a predetermined threshold even after multiple iterations of active learning and re-assignment of one of the predetermined classifications.

In addition to the categorization 156 of the closed log entries 120, the model testing outputs 154 may also include generation of the automation index 158 and the prioritization 160 for each of the closed log entries 120. In some examples, the prioritization 160 may be generated based on the automation index 158. Each of the categorization 156 (category ID), the automation index 158 and the prioritization 160 may be generated and inserted in a respective open log entries 118 by an insert engine 168. The insert engine 168 may add fields to respective open log entries 118 to receive the categorization 156 (category ID), the automation index 158 and the prioritization 160.

The automation index 158 generated for each of the respective open log entries 118 may be indicative of accuracy of the category identifier assigned to the respective historical log entry. The automation index 158 may be employed for the acceptance of the categorization provided by the statistical model 142 with a confidence that is determined by the predetermined threshold. A more stringent threshold results in higher categorization quality metrics, such as higher accuracy for supervised learning, at the cost of a decreased number of closed log entries 120 that can be considered resolved, closed or final. On the other hand, a less stringent threshold will increase the number of historical log entries that can be resolved at a cost of lower categorization quality metrics.

If, for example, the automation index 158 of some of the closed log entries 120 exceed a predetermined threshold, those closed log entries 120 can be deemed closed, resolved or finalized as confirmed by a suitable quality control system, such as Total Quality Management (TQM), 6-Sigma, rules-based determination or expert review. Alternatively, those closed log entries 120 with an automation index below the predetermined threshold remain open to be tested in the next cycle of learning.

Prioritization 160 may be used to identify only some of the open log entries 118 as being priority log entries 172, or priority transactions, based on, for example, the automation index. Those open log entries 116 that are identified as priority log entries 172 are determined by the classifier 152 as being representative of other open log entries 118 assigned the same category identifier. Prioritization 160 may represent a potential impact of an open log entries 118 on other relationally nearby open log entries 118. Prioritization may be generated and assigned to an open log entries 118 based on a predetermined criterion. For example, prioritization may be based on: 1) dataset analysis to identify similarity of words in different open log entries 118; 2) external data sources review via the interface 166 to identify corresponding activity/existence in other third party information, such as Google News and the like to identify other open log entries 118 that describe corresponding activities; and/or 3) semantic analysis of different open log entries 118 to determine a context or words included in the different open log entries 118 and the semantical impact the open log entries 118 has on others. In another example, prioritization may be based on a frequency of appearance of data in each of the open log entries 118 in an identified grouping. In this example, prioritization may be based on the frequency a dominant term, such as a particular G/L code or a vendor appears.

As a result of the prioritization 160, the classifier 152 may identify only some of the open log entries 118 as priority log entries 172. Identification may involve iteratively selecting a predetermined number of the open log entries 118 as priority log entries 172, and iteratively ranking the priority log entries 172 according to the automation index and a ratio representative of an amount of overlap with words present in the reference dataset. For example, identifying only some of the open log entries 118 as being priority log entries 172 may include nesting groups of the open log entries 118 based on a set of predetermined common characteristics. The nesting may be performed by sorting the common characteristics in decreasing ordering of appearance in the open log entries 118 within a nested group of open log entries 118, and selecting only some of the historical log entries as priority log entries 172. For example, open transactions having the highest appearing common characteristics may be selected as priority log entries.

A priority gate 170 included in the categorization engine 106 may direct only those open log entries 118 identified as priority log entries 172 to the verification engine 144. The remaining non-priority log entries 174, or non-prioritized open log entries 118, may be directed to an index gate 176. The index gate 176 may review the automation index 158 assigned to each of the respective non-priority log entries 174. If the automation index 158 of a non-priority log entry 174 is at or above a predetermined threshold, the non-priority log entry 174 is identified as a closed transaction 178 by the index gate 176. In other words, an open log entry 118 is converted to a closed log entry 120. The closed transactions 178 are obtained from those open log entries 118 where the assigned categorization has been accepted by the system as accurate. Such closed transactions 178 may be identified as closed log entries 120, which may be stored in the modelling database 140 as part of the reference dataset. If the automation index 158 of a non-priority log entry 174 is below the predetermined threshold, the non-priority log entry 174 may be identified as an open transaction 180 by the index gate 176 and continue to be stored as open log entries 118 in the open transaction database 126.

The open log entries 118 may also include new log entries 118 from the new transaction data 116, which may be added as new transactions to be categorized by the dynamic learning engine 138. Since the open log entries 118 are newly added new transaction data 116, or are previously processed open log entries 118, removal of unnecessary transactions may not be necessary so long as the new transaction data 116 is accurate and concise. Optionally, similar to the processing of the historical log entries 110 included in the historical transaction data 112 by the filtering engine 102, the open log entries 118 may be filtered to remove unnecessary transactions and to select only some of the open log entries 118 for categorization. Also, similar to the operation of the processing engine 104, the open log entries 118 may be optionally be subject to pre-processing with a pre-processing engine (not shown) and representation as log entries by a log entry representation engine (not shown).

Optional processing of the open log entries 118 similar to that performed by the filtering engine 102 and/or the processing engine 104 will not be repeated for purposes of brevity, and is illustrated in FIG. 2 by a filtering and processing engine 182. Such processing may also include the addition of tokens to each of the open log entries 118, in addition to, or as an alternative to, any of the other functionality performed by the filtering engine 102 and the processing engine 104. The level of processing of the open log entries 118 may be the same or less than that performed by the filtering engine 102 and the processing engine 104 depending on the nature and content of the data included as the open log entries. Thus in some examples, the entirety of processing by the filtering engine 102 and processing engine 104 may be performed, or some portion of the described processing of the filtering engine 102 and the processing engine 104 may be performed, or processing by the filtering engine 102 and the processing engine 104 may be omitted entirely. It is to be noted that the filtering engine 102 functionality and/or the processing engine 104 functionality performed on the open log entries 118 do not result in the open log entries 118 being changed to closed log entries 120 since that process is performed differently in the categorization engine 106, as described herein.

The open log entries 118 may be represented as vectors by the log entry representation engine 170. The vector representations of the open log entries 118 may be provided to the classifier 152 for categorization.

The verification engine 144 may be used as part of quality control of the categorizations of the closed log entries 120. Statistical groupings performed based on supervised learning may be generated by the model of supervised learning 146 in order to perform the categorization of the closed log entries 120. However, there are many applications where quality control of the categorizations is complex and can be costly. These are often due to constraints to perform quality control such as cost, effort, computation, lead-time, lag-time, process-time, and/or the quantity of transactions involved in the review of the closed log entries 120. For example, it may take an elaborate quality control process to confirm the cost category of a financial transaction is accurately assigned because of the complexity of the information consisting of the account description, item description, vendor, purchaser, and other related information. The verification engine 144 provides technical benefits by improving the functioning of the underlying computer hardware itself by efficiently improving the accuracy of the categorizations. By automatically performing the complex processing needed to provide quality control and improve accuracy of the categorizations, workflow performance of the computer hardware may be realized by reduced processing time iterative re-categorizations.

Quality control of categorizations performed with the verification engine 144 may include the verification engine performing: (1) corrections of class labels present from the historical log entries 110, corrections and/or details of the transaction, forceful deletion and/or re categorization of a respective category assigned to closed log entries 120 as an exception and/or deviation from historical characteristics of the historical log entries and/or (2) merging, splitting, or appending of groupings by using a suitable grouping technique in order to increase the grouping quality metric per transaction or per group. Grouping techniques such as a height of cutting a hierarchical clustering tree, a number of seeds in k-means clustering, and other such techniques may be used.

The verification engine 144 may verify the categorization of a priority log entry 172, and identify the priority log entry 172 as a verified priority log entry 190. The verified priority log entries 190 may be further identified as a closed log entry 120. The verified priority log entries 190 may be supplied to the statistical model building engine 164. Accordingly, the statistical model building engine 164 may further develop the model based on such verified priority log entries 190.

Performance of active learning by the dynamic learning engine 138 may involve quality control of categorizations assigned to open log entries 118 by the classifier 152. Due to the complexity/cost and effort involved in quality control, there are several scenarios in which selection of open log entries 118 for quality control analysis by the verification engine 144 may be optimized to maximize the rate of increase of categorization accuracy using quality metrics per open log entry 118 under the constraints of the quality control. This may be at least part of an essence of active learning performed using the statistical model building engine 164. As a result, efficiency in performance of the underlying computer hardware may be achieved due to reduced processing complexity and duration when assigning categories to closed log entries 120.

The verification engine 144 may identify priority log entries 172 with mis-assigned category identifiers. Identification of the mis-assigned category identifiers may be by rules based analysis, quality control analysis or human evaluation. The verification engine 144 may also replace the assigned categorizations (category identifiers) of at least some of the priority log entries 172. Upon reviewing the accuracy of an assigned category and determining the categorization 156 is mis-assigned, the verification engine 144 may replace the respective category identifiers of at least some of the priority log entries 172. Identification of a replacement category may be rules based, logic based or by human experts based on the content of a respective closed log entry 120. The replacement category may be selected from a set of predetermined categories. Upon replacement of the category assigned by the statistical model 142, the respective priority log entry 172 may be stored as part of the reference dataset.

The verification engine 144 may also include an insert engine 190 and a removal engine 192. The insert engine 190 may generate and insert a new category into a priority historical log entry 172 that is determined to be mis-categorized. The new category may be generated and inserted as a replacement category by insert engine 190 due to none of the predetermined categories being accurate for assignment to the mis-categorized priority historical log entry 172. The new category identifier may be calculated based on the data content in the priority log entry 172 using rules, logic and/or human experts.

New categories developed by the verification engine 190 may be added to the set of predetermined categories assigned to the historical log entries by the statistical model 142. In addition, the new category identifier may be stored in the database in association with the respective priority log entry 172, and the priority log entry 172 may be stored as part of the reference dataset.

The removal engine 192 may be used to identify priority closed log entries 120 that are unnecessary transactions and should be removed.

The changes to the assigned categorizations may be iterative where the priority log entry 172 is again identified as mis-assigned after further processing by the statistical model 142. Priority log entries with changed assigned categorizations may be provided to the statistical model building engine 164 as part of the verified priority log entries 190 so that the model can be further trained using these verified priority log entries 190.

Based on further training of the statistical model 142 with the verified priority entries 190, respective category identifiers of at least some of the priority log entries may be iteratively changed with the dynamic learning engine 138. In addition, at least some of the other closed log entries 120 may be updated/re-assigned in response to iteratively changing respective category identifiers of at least some of the priority log entries.

Iterative prioritization may also be performed by the categorization engine 106 for active learning. Prioritization may be used to identify only some of the closed log entries 120 as priority log entries. To maximize the effect derived from a relatively small number of quality controlled closed log entries 120, a process of iterative prioritization is performed using the statistical model 142 and the verification engine 144. At each iteration, the categories are re-estimated and re-assigned as deemed appropriate by the classifier 152 based on the statistical learning techniques deployed by the statistical model building engine 164 to update the model used by the classifier 152. In addition, the classifier 152 assigns/re-assigns prioritization 160 to each of the closed log entries 120.

Performance of prioritization of the historical log entries for active learning may be by the classifier 152. The objective of prioritization 160 of the closed log entries 120 for quality control may include maximizing the mean of the automation indices 158 after the quality control of each iteration.

Different strategies may be employed to prioritize closed log entries 120 for re-categorization. Re-categorization of closed log entries 120 may include, for example, re-estimating the model with the statistical model building engine 164, re-grouping the closed log entries 120 with supervised and unsupervised learning using the classifier 152 and the re-estimated model, identifying historical log entries which can be closed and made part of the reference dataset, and other iterative processing of the historical log entries.

For example, the dynamic learning engine 138 may perform nested grouping of the historical log entries on a set of relevant characteristics of the closed log entries 120. Relevant characteristics upon which closed log entries 120 may be nested, or grouped, may be, for example, general ledgers identifiers, vendor name, cost centre for financial historical log entries or any other characteristic repeated in, at least some of the different closed log entries 120. For each group, identified, the classifier 152 may perform (1) and (2) below in sequence: (1) Sort the characteristic in decreasing order of the volume of historical log entries and/or one or more categorization quality metrics, such as the automation index of the closed log entries 120; and (2) Select the unique value/values from the top (highest sorted order).

In another example to prioritize the closed log entries 120, the classifier 152 may filter closed log entries 120 that have a probability of being accurately assigned which is below a certain threshold. In this example, the classifier 152 may group closed log entries 120 based on a predetermined characteristic, such as a general ledger identifier, a vendor name, a cost center in financial historical log entries, or some other parameter included in multiple of the closed log entries 120. The classifier 152 may also perform choice-based sampling without replacement using appropriate weights associated with each group as the sampling probability for the group. Two example strategies for determining appropriate weights for groups of closed log entries 120 are: (1) Calculate weights for each group by applying a monotonically linear function of the frequencies of appearance of terms in the historical log entries, such as, for example, calculate a logarithm of frequencies of appearance of words in the closed log entries 120 in a group; or (2) Calculate correlations between groups along an aggregate grouping quality metric. The aggregated grouping quality metric may be, for example, an average probability of closed log entries 120 being accurately assigned to a group. Based on the correlations, build a network of groups by applying a suitable threshold on the correlations. Determine group weights as a suitable centrality value from the network. A suitable centrality value may be determined as the group weights by, for example, harmonic, between-ness, eigenvector, Katz centrality, or some other statistical determination.

Update of the categorizations of the closed log entries 120 which are still open may be performed by the classifier 152 after the reference dataset is updated with closed closed log entries 120 by the statistical model building engine 164. Update of the categories may be performed by the classifier using supervised learning since the closed log entries 120 have been previously assigned a classification in a previous iteration. The closed log entries 120 chosen for estimating the categorization could include:

Closed log entries 120 used for active learning by the statistical model building engine 164 which were prioritized to be priority log entries during the previous iteration and confirmed as accurate by the verification engine 144.
  Closed log entries 120 found by the verification engine 144 to have incorrect categories assigned (e.g., misclassifications) during quality control represented with higher resampling with replacement probability.

An overview of example methodologies employed in each of the workflow steps is described below.

Train: Training for default mapping may involve a sequence of methods to prepare and vectorise the data for statistical model building by the statistical model building engine 164 as well as to build the model, as discussed.

Default Mapping: Default Mapping for a new client involves a sequence of steps to prepare and vectorise historical transaction data 112 and new log entries 130 followed by application of the statistical model 142 built in the Train step (above) to map the closed log entries 120. Mapping of the closed log entries 120 is based on iterative determination and generation of the categorization 156 as a model output 154.

In addition to the categorization 156, the outputs from Default Mapping include a number of parameters output by application of statistical modeling. For the each cycle of active learning the following outputs from Default Mapping are employed:

Automation Index 158—employed for the acceptance/rejection of the category provided by the statistical model 142 with a confidence that is determined by the threshold configured.

Prioritization 160—conducted to select closed log entries 120 for review by the verification engine 144 to generate client specific input data for online training. Prioritization 160 of closed log entries 120 for review is conducted to maximize the increase in mean automation index at each active learning cycle per reviewed transaction. Increasing the number of historical log entries with automation index over a predefined threshold is desirable as this is the metric used for the acceptance of the category provided by the statistical model 142.

Online Train: Online training involves a sequence of steps to prepare and vectorise input data (reviewed prioritized closed log entries 120 from new log entries 130 as well as historical transaction data 112) for statistical model building as well as to build the active learning model.

Online Test: Online testing involves a sequence of steps to prepare and vectorise the new client data followed by application of the statistical model 142 built with the statistical model building engine 164. Online training may be part of active learning. The outputs from online testing may be provided as outputs from the statistical model 142. For the continuation of active learning the following outputs are employed:

Automation Index 158 uses the default mapping outputs.
Prioritization 160 also uses the default mapping outputs.

Training for Default Mapping

Data sourcing for training—the statistical model 142 uses a reference dataset included in the database 124. The reference dataset may include closed log entries 120 with closed lines.

Data Preparation of Historical Log Entries 110 in the Historical Transaction Data 112 for Training In an example, the historical transaction data 112 may be filtered column wise by the filtering engine 102:

Extract data from relevant feature columns. For example, feature columns may include: unique identification number (UIN), predictive variables, cost center, purchase order, standard category, standard subcategory.

Alternatively, or in addition, the historical transaction data 112 may be filtered row wise by the filtering engine 102:

Remove duplicate historical log entries 110 based on key fields in the historical log entries 110. Examples of key fields may include: GL Account Description, Vendor and Subcategory. Removal of duplicate historical log entries 110 may significantly reduce the size of the historical data database, such as from 16,564,733 lines to 548,959 lines improving efficiency and performance.

Remove historical log entries 110 with predetermined existing labels. For example for historical log entries 110 with a GL Account Description—Vendor combinations associated with more than one category may be removed, which may—significantly reduce historical data database, such as from 548959 lines to 425478 lines. This technique may also remove confusing historical log entries 110.

Remove historical log entries 110 where predetermined fields in the historical log entries 110 are blank. For example, remove historical log entries 110 where the GL Account Description is blank, which may—significantly reduce historical data database from 425478 lines to 398941 lines. Such blank predetermined fields may be removed as non-reliable historical log entries where the data missing from the field is a main driver of categorization.

Remove historical log entries 110 contained in a 'master exclusion list' deemed to be confusing/misleading log entries which may, significantly reduce the size of the historical data database, such as from 398941 lines 386052 lines.

Example of Default Mapping for New Transaction Data 116

In an example, the historical transaction data 112 may be filtered column wise by the filtering engine 102:

Load in selective columns from the open log entries 118. Example of selected columns may include: Unique Identification Number (UIN), predictive variables, cost center, purchase order number and the like.

Cleaning (to standardize the semi-structured data) may be split into two functions to produce one of the outputs of default mapping: cleaned fields without removal of stop words. Removal of stopwords is carried out subsequently, and prior to vectorization.

Cleaning 1
 Removes punctuation
 Converts to lower case
 Removes leading or trailing whitespaces
 Retains words with a minimum count of 2
Cleaning 2
 Removes stopwords
Feature Engineering
 The predictive variables used are GL Account Description and Vendor. These 2 columns are transformed by adding a suffix to each of the words per variable to denotes their origin (GL Account Description or Vendor) and then merged. The resultant merged field is the predictive variable: GL-Vendor is used as input to model for classification.

Vectorization of New Client Data—The BoW model built during the Statistical Modelling phase may be used to transform the Client data (categorical) into numerical representation. The transformed client data columns may be the words as per the BoW model, the number of rows may be equal to the number of client lines and the data values per line and columns may represent the frequency count of the word represented by the respective column for the line.

In an example application of the statistical model 142, the input may be vectorised closed log entries 120. The output from statistical model 142 may be the model outputs 138. In addition, the output may include:

Cleaned fields—derived with statistical model building using classifier 152. The cleaned fields may be reviewed to confirm accuracy.

Automation Index 158—produces a metric enabling users to know the quality of data provided (the metric is proportional to the number of words present at a transactional level for the descriptive features of interest following cleaning)

First prediction, second prediction, probability of first prediction, probability of second prediction—Outputs information in relation with the predicted class along with a probability score to provide insight into ability to 'trust' the trained model on a transaction level.

Word Overlap (Confidence) Index (C) is a measure of the similarity of the words in a transaction to those in the training dataset on which the transaction was last evaluated. It is calculated as the ratio of words present in a transaction that were also present in the input data employed in the latest build of the statistical model for the categorization of the transaction.

Priority for review—used to identify the order in which historical log entries need to undergo manual review during the active learning process. The goal is to target client-specific data that will result in a new model with improved performance and a higher mean Automation Index.

Priority for review of closed log entries 120 may be chosen in any of several ways. In an example, priority determination may involve focusing on a subset of closed log entries 120 with relatively low probabilities derived from the statistical model 142, such as an automation index below 0.6, to focus on closed log entries 120 that might be incorrectly classified. Subsequently, a sampling strategy may be applied to focus on selected closed log entries 120 with the objective to have maximum impact on accuracy per reviewed transaction. Sampling weights may also be calculated. In an example, sampling weights may calculated as follows: closed log entries 120 may be grouped by a common term, such as by a GL Account Description and the weight of the groups may be calculated by applying a function such as the natural logarithm of their frequencies. Selected samples of closed log entries 120, such as 100 different closed log entries 120 per iteration may be selected from each group as priority log entries based on their weight.

Automation index—in an example may be derived by a combination of probability score and word overlap index. For example the automation index may equal the probability score*word overlap index. The automation index 158 may be used to identify which lines can be closed automatically without the need of manual review. The application of a more stringent Automation Index threshold will result in higher overall accuracy at the cost of number of historical log entries that can be considered resolved, closed or final. On the other hand, a less stringent threshold will increase the number of historical log entries that can be resolved at a cost of lower accuracy.

Keywords per predictive variable—keywords outputted for both predetermined fields in the closed log entries 120. The predetermined fields may be, for example, the GL Account Description and the Vendor. The words present in each of the predetermined fields may be ranked according to the variable importance from the model, and the top 3 words may be outputted. This may provide insight into the important words per transaction. Importance reflects the influence of the word/term on the setting of the decision boundaries of the model.

Active Learning
Online Training
Data sourcing for online training may be the reference dataset.
The reference dataset may be closed log entries 120 that are closed lines, which were prioritized for review by the statistical model 142. These reviewed lines may be used as the training dataset for online training. Additionally, historical transaction data 112 may be configured to combine with these reviewed lines to form a larger online training set. This can be configured as follows:

Data Preparation for Online Training
This data may be previously prepared using Default Mapping by vectorisation of closed log entries 120.
The minimum frequency threshold is set to 1 in online training and this is configurable as follows:

Statistical Model Building
Input-Data used to build the model may be the historical log entries that were prioritized for review. In some examples, the classifier 152 may also be trained on a predictive variable to output a model.
Classifiers—assign categories to the closed log entries 120.
Output-Output from statistical modelling is the statistical model and variable importance.

Online Testing
Data sourcing for online testing may be new data that are has not been used as input in the building of the Statistical Model 142.
The new data may be prepared for online testing by, for example, removing duplicates.
Vectorisation of new data
Application of statistical model 142
Input: Statistical model inputs (as previously discussed) and closed log entries 120 that are open transactions 180. Open transactions 180 may be closed log entries 120 that haven't been reviewed by the verification engine 144 or made closed transactions 178 based on the automation index 158. These open transactions 180 may have been previously prepared using Default Mapping during building of Statistical Model.
Output: Statistical model output. Outputs may be updated with each iteration except cleaned fields and quality index may not change, hence they may not be output.

An example of a number of cycles or iterations of active learning, may be, for example, 10 iterations of Active Learning with a set of 100 historical log entries per iteration.

Figure 8:
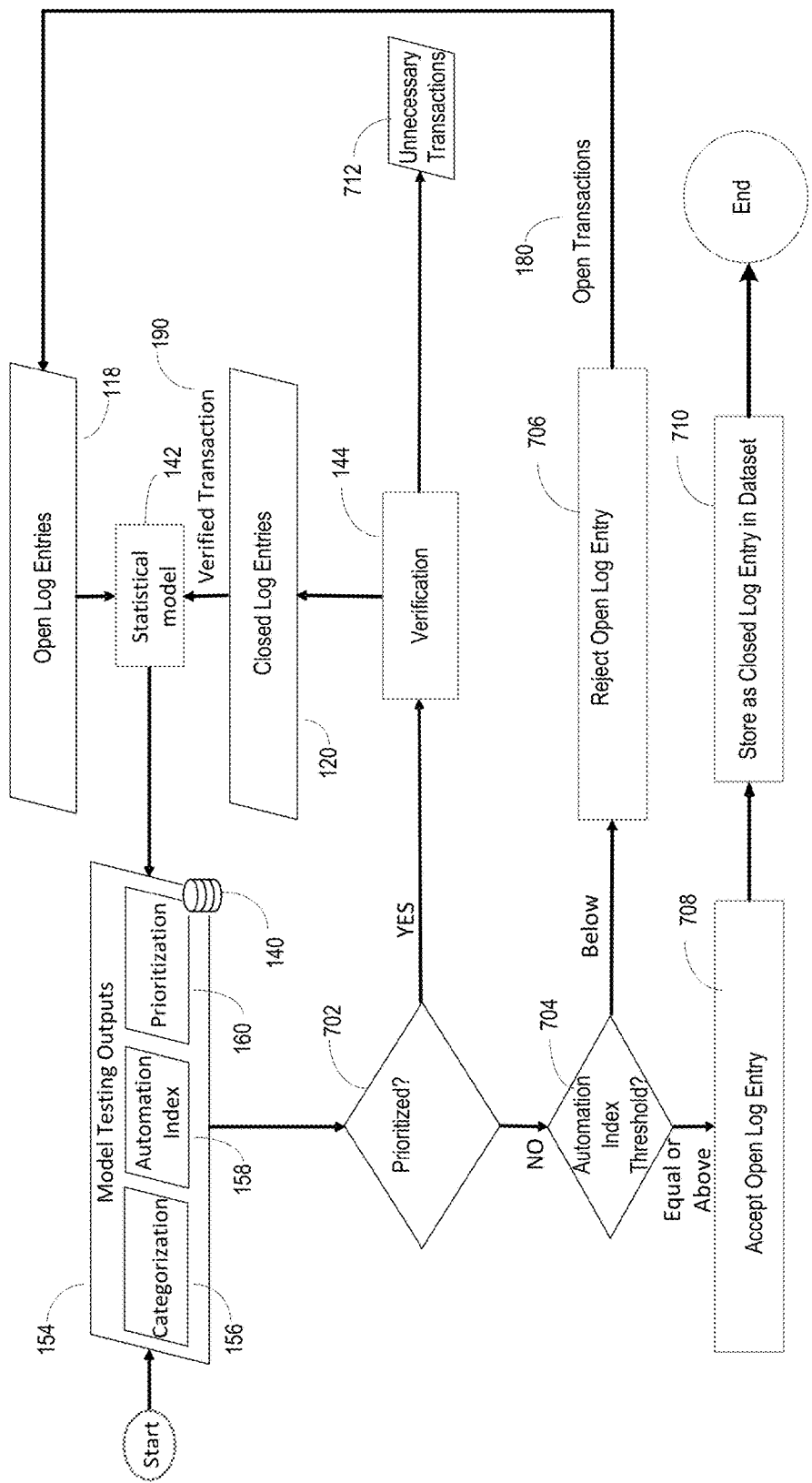
FIG. 8 is an operational flow diagram illustrating an example of categorization of log entries.

FIG. 8 is an operational flow diagram illustrating an example of categorization of historical log entries. Referring to FIG. 8 and FIGS. 1 and 2, example operation of the categorization module 106 is illustrated to categorize and update categorization of the open log entries 118 using the dynamic learning engine 138.

The operation begins with the model testing output 154, namely the categorization 156, automation index 158 and prioritization 160 being assigned and associated with respective open log entries 118 in the open transactions database 126. Each of the categorized open log entries 118 are analyzed.

It is determined if the open log entry 118 under analysis is prioritized by the priority gate 170. (702) If no, it is determined if the automation index 158 is at or above the predetermined threshold by the index gate 176. (704) If the automation index 158 is below the predetermined threshold, the open log entry 118 is rejected and returned as an open transaction 180 to the open log entries 118 for re-evaluation and category re-evaluation/re-assignment. (706) If the automation index 158 is at or above the predetermined threshold, the categorization of the open log entry 118 is accepted as accurate with a confidence of accuracy determined by the predetermined threshold.(708) The open log entry 118 is then converted to a closed log entry 120 and stored in the reference dataset included in the modelling database 140. (710)

If the open log entry 118 is prioritized as determined by the priority gate 170, the prioritized log entry 172 is provided to the verification engine 144 to determine the accuracy of the categorization and otherwise perform quality control functions for the prioritized log entry 172. The verification engine 144 may use rules, quality control, or external review via the interface 166 to determine that the prioritized log entry is an unnecessary transaction and may be removed as an unnecessary transaction. (712) For example, an outlier transaction, or a transaction with incomplete or incorrect data included therein may be identified as unnecessary. Alternatively, the verification engine 144 may determine the prioritized open log entry 172 is correct and may be identified as a closed log entry 120. Such open log entries 118 that are verified and converted to a closed log entry 120 may be provided to the statistical model building engine 164 as verified transactions 190 for use in further training the statistical model 142.

This creates an iterative process in which open log entries 118 are repeatedly categorized by the statistical model 142 until they are determined to be accurate and are identified as closed log entries 120. In addition, a prioritization and an automation index is repeatedly calculated and assigned. By this iterative computer automated process, categorization of the closed log entries 120 may be iteratively increased in accuracy until an acceptable level of accuracy is reached. As historical log entries are accurately categorized by this iterative process and stored as part of the reference dataset, the accuracy of categorization increases due to the ongoing active learning by the statistical model building engine 164.

Among other aspects, the dynamic learning engine 138 and the verification engine 144 cooperatively operate to improve the functioning of the underlying computer hardware itself. That is, these features (among others) are specific improvements in the way that the underlying computer system operates. The improvements facilitate the efficient and accurate categorization of open log entries 118, and conversion to closed log entries 120 thereby minimizing processing time and processing resources of the computer system. The improved functioning of the underlying computer hardware itself achieves further technical benefits. For example, the architecture automatically performs the complex processing needed to improve workflow performance, and thereby reduces manual intervention and reduces the possibility for human error. Still further, the system facilitates a reduction in resource expenditure, including reduced storage volume accesses and processor-driven analytics, because the architecture reduces or eliminates log entries that are duplicative or outliers while efficiently creating accurate categorization of open log entries 118. Also, cumbersome and inexact manual tuning and analysis of the log entries, data sources and workflows is fully avoided, in favor of the computer based processing, analysis and categorization of the open log entries 120.

The methods, devices, processing, circuitry, engines and logic described above may be implemented in many different ways and in many different combinations of hardware and software. For example, all or parts of the implementations may be engines in the form of circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry or an engine that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A system comprising:
a memory and a hardware processor configured to:
filter historical data to remove inconsistent log entries or exception log entries and generate a plurality of closed log entries;
generate a token for each of the closed log entries, the token associated with a respective word in a respective closed log entry and being representative of a source of origin of the respective word;
generate vector representations of the closed log entries that are compacted closed log entries, wherein each of the compacted closed log entries include a category identifier, the category identifier pre-defined in the historical data;

execute a dynamic learning engine to assign one of a plurality of predetermined categories to each of a plurality of open log entries in accordance with a reference dataset of closed log entries and respective tokens;

generate an automation index for each of the open log entries, the automation index output as a value indicative to a user of accuracy of the assigned one of the plurality of predetermined categories;

identify only some of the open log entries as priority log entries, the priority log entries identified based on the automation index and being representative of a group of the open log entries;

analyze independently each of the priority log entries for accuracy of assignment of one of the predetermined categories by the dynamic learning engine;

change a respective predetermined category assigned to at least one of the priority log entries; and store the at least one of the priority log entries as a closed log entry.

2. The system of claim 1, wherein the processor is further configured to:

execute the dynamic learning engine to re-evaluate and re-assign one of the plurality of predetermined categories to each of the open log entries based on the respective tokens, and the change to the respective predetermined category assigned to the at least one of the priority log entries;

revise the automation index for at least some of the open log entries; and store at least one of the open log entries as part of the reference dataset based on the automation index being above a predetermined threshold.

3. The system of claim 1, wherein the processor configured to identify only some of the open log entries as priority log entries comprises the processor configured to apply statistical sampling of the open log entries to identify priority log entries.

4. The system of claim 1, wherein the processor configured to execute the dynamic learning engine to assign one of a plurality of predetermined categories to each of the open log entries comprises the processor is further configured to generate a new predetermined category and re-assign at least one of the open log entries to the new predetermined category.

5. The system of claim 1, wherein the processor configured to generate vector representations of the closed log entries, further comprises the processor configured to generate a word vector for each of the closed log entries, and identify frequency of occurrence of words in each of the closed log entries to generate the vector representations of each of the closed log entries.

6. The system of claim 1, wherein the processor configured to identify only some of the open log entries as priority log entries comprises the processor iteratively selecting a predetermined number of the open log entries as priority log entries based on categorization using a categorization decision tree, and the processor further configured to iteratively rank the priority log entries according to the automation index and a ratio representative of an amount of overlap with words present in the open log entries.

7. The system of claim 1, wherein the processor configured to filter historical data to remove inconsistent log entries or exception log entries and generate a plurality of historical log entries comprises the processor further configured to perform supervised learning, in response to historical data that includes a group label, to identify dominant groups having a same group label, or perform unsupervised learning to generate clusters of historical log entries based on dominant shared features of log entries.

8. The system of claim 1, wherein the token is representative of a hierarchy and a field of origin of the respective word, and the processor is further configured to add the token for each respective word as a field in the respective closed log entry.

9. The system of claim 8, wherein the processor is further configured to process each respective closed log entry to merge duplicative words in the respective closed log entry that each have a token indicative of the same origin of the word, to remove duplicative words from the respective closed log entry.

10. The system of claim 9, wherein the processor is further configured to generate a respective word vector for each respective closed log entry, restrict a length of the respective word vector to a predetermined word count, and identify a frequency of occurrence of words in each of the closed log entries to create the vector representations of each respective closed log entry.

11. A method comprising:

filtering a plurality of log entries in historical data to remove outlier log entries and generate closed log entries, the closed log entries stored as a reference dataset in a database;

generating a token for each of the closed log entries, the token indicative of an origin of a word included in a respective closed log entry;

storing, in a field in the database, the token in association with a word in the respective closed log entry;

generating vector representations of the closed log entries that are compacted closed log entries, wherein each of the compacted closed log entries include a category identifier, the category identifier pre-defined in the historical data;

assigning a category identifier to each of a plurality of open log entries with a dynamic learning engine based on the reference dataset and tokens stored therein, the category identifier indicative of one of a plurality of predetermined categories and stored in association with respective open log entries;

generating an automation index for each of the open log entries, the automation index of a respective open log entry output to a user as a metric indicative of accuracy of the category identifier assigned to the respective open log entry;

identifying only some of the open log entries as priority log entries based on the automation index, the priority log entries being representative of other open log entries assigned a same category identifier;

iteratively changing respective category identifiers of at least some of the priority log entries, with the dynamic learning engine, based on identification by a verification engine of mis-assigned category identifiers;

iteratively updating, with the dynamic learning engine, at least some of the other open log entries in response to iteratively changing respective category identifiers of at least some of the priority log entries; and storing at least some of the open log entries as part of the reference dataset.

12. The method of claim 11, wherein changing respective category identifiers of at least some of the priority log entries comprises storing, as part of the reference dataset, a new category identifier in association with the at least some of the priority log entries.

13. The method of claim 12, wherein changing respective category identifiers of at least some of the priority log entries comprises assigning, with the dynamic learning engine, the new category identifier to open log entries previously assigned the category identifier.

14. The method of claim 11, wherein storing at least some of the open log entries as part of the reference dataset comprises storing, as part of the reference dataset, only open log entries having the automation index above a predetermined value.

15. The method of claim 11, wherein iteratively changing respective category identifiers of at least some of the priority log entries comprises generating another automation index for at least some of the open log entries, and only storing open log entries as part of the reference dataset when the another automation index is above a predetermined threshold.

16. The method of claim 11, wherein generating the token for each of the closed log entries comprises merging words in the respective closed log entry having the token indicative of the origin of the word included in the respective closed log entry.

17. The method of claim 16, wherein generating the token for each of the closed log entries comprises removing duplicate words or symbols from each of the closed log entries, and generating vector representations of the closed log entries comprises generating a respective word vector for each of the closed log entries, wherein generating the respective word vector comprises restricting a length of the respective word vector to a predetermined word count.

18. The method of claim 11, wherein identifying only some of the open log entries as being priority log entries further comprises nesting groups of the open log entries based on a set of predetermined common characteristics, the nesting comprising: sorting the predetermined common characteristics in decreasing ordering of appearance in the open log entries within a nested group of open log entries, and selecting the only some of the open log entries from open log entries having most prevalently appearing common characteristics.

19. The method of claim 11, further comprising iteratively training the dynamic learning engine by storage of additional open log entries as part of the reference dataset, the additional open log entries having an automation index greater than a predetermined threshold.

20. The method of claim 11, wherein identifying only some of the open log entries as being priority log entries further comprises identifying open log entries having the automation index below a predetermined threshold, grouping the open log entries identified as having the automation index below the predetermined threshold according to a predetermined common characteristic, and calculating weight values for each group of open log entries by:

applying a monotonically linear function to a selected predetermined characteristic in each group of the open log entries to identify the only some of the open log entries according to the weight values applied, or calculating correlations between the groups based on a correlating characteristic between the groups, building a network of the groups by applying a predetermined threshold to the calculated correlations, and weighting the open log entries in each of the groups to identify the only some of the open log entries from the network.

21. A non-transitory computer readable medium configured to store instructions executable by a processor, the computer readable medium comprising:

instructions executable by the processor to filter historical data to generate closed log entries, each of the closed log entries comprising a plurality of words;

instructions executable by the processor to store the closed log entries as a reference dataset in a database;

instructions executable by the processor to add a token as a new field in each of the closed log entries, the token indicative of a source of origin of a word included in a respective closed log entry;

instructions executable by the processor to generate vector representations of the closed loci entries that are compacted closed log entries, wherein each of the compacted closed log entries include a category identifier, the category identifier pre-defined in the historical data;

instructions executable by the processor as a dynamic learning engine to assign a category identifier to each of a plurality of open log entries based on the reference dataset and the token added to the respective closed log entry;

instructions executable by the processor to calculate an automation index for each of the open log entries, the automation index output as a metric indicative to a user of a level of accuracy of the category identifier;

instructions executable by the processor to select only some of the open log entries based on the automation index;

instructions executable by the processor to selectively change the category identifier of the selected only some of the open log entries; and instructions executable by the processor to store the selected only some of the open log entries which have the category identifier selectively changed as part of the reference dataset to form an updated reference dataset.

22. The computer readable medium of claim 21, further comprising instructions executable by the processor as the dynamic learning engine to update the category identifier of at least some of the open log entries, the category identifier updated based on the updated reference dataset.

23. The computer readable medium of claim 21, further comprising instructions executable by the processor to prioritize each of the open log entries based on an impact of a respective open log entry on other open log entries, and instructions executable with the processor to select only some of the open log entries comprises instruction executable with the processor to select open log entries prioritized with higher priority as the only some of the open log entries.

* * * * *

UNITED STATES PATENT AND TRADEMARK OFFICE
CERTIFICATE OF CORRECTION

PATENT NO. : 10,685,044 B2
APPLICATION NO. : 15/804815
DATED : June 16, 2020
INVENTOR(S) : Abhilash Alexander Miranda et al.

It is certified that error appears in the above-identified patent and that said Letters Patent is hereby corrected as shown below:

In the Specification

In Column 7, Lines 2-3, delete "to build the model, as disctransaction" and replace with --entries 110 from historical transaction--.

In Column 7, Line 10, delete "closedclosed" and replace with --close--.

In Column 7, Line 13, delete "closedclosed" and replace with --closed--.

In Column 7, Line 15, delete "closedclosed" and replace with --closed--.

In Column 9, Line 44, insert a character space between "1,2".

In Column 10, Line 21, delete "entires" and replace with --entries--.

In Column 11, Line 25, delete "perfoming" and replace with --performing--.

In Column 11, Lines 57 and 58, delete "simularities" and replace with --similarities--.

In Column 11, Line 59, delete "levensthein" and replace with --Levensthein--.

In Column 14, in the last line of Table 2 (approx. Line 42), delete "N.M-" and insert --N.M- -- at the end of the previous line (approx. Line 41), after "1.1.accounts".

In Column 15, Line 7, delete "respresentation" and replace with --representation--.

In Column 22, Line 35, delete the second instance of "closed".

Signed and Sealed this
Twenty-ninth Day of September, 2020

Andrei Iancu
*Director of the United States Patent and Trademark Office*

In the Claims

In Column 32, Claim 21, Line 22, delete "loci" and replace with --log--.